United States Patent [19]
Izumi

[11] Patent Number: 6,032,049
[45] Date of Patent: Feb. 29, 2000

[54] WIRELESS TELECOMMUNICATION SYSTEM USING FREQUENCY HOPPING, AND METHOD OF CONTROLLING SAME

[75] Inventor: Michihiro Izumi, Yokohama, Japan

[73] Assignee: Canon Kabushiki Kaisha, Tokyo, Japan

[21] Appl. No.: 08/751,157

[22] Filed: Nov. 15, 1996

[30] Foreign Application Priority Data

Nov. 20, 1995 [JP] Japan .................................. 7-301251

[51] Int. Cl.⁷ .............................. H04Q 7/20; H04B 1/713
[52] U.S. Cl. ......................... 455/509; 455/463; 455/464; 375/202
[58] Field of Search .................................... 455/434, 450, 455/463, 464, 509; 375/202; 370/330

[56] References Cited

U.S. PATENT DOCUMENTS

| | | | |
|---|---|---|---|
| 4,554,668 | 11/1985 | Deman et al. | 375/202 |
| 5,142,534 | 8/1992 | Simpson et al. | 370/330 |
| 5,463,659 | 10/1995 | Nealon et al. | 375/202 |

*Primary Examiner*—Andrew M. Dolinar
*Attorney, Agent, or Firm*—Fitzpatrick, Cella, Harper & Scinto

[57] ABSTRACT

A decline in effective data transmission speed and interference between adjacent channels are prevented in a wireless telecommunication system. A hopping pattern used in direct communication between wireless telecommunication terminals is stored in the wireless telecommunication terminal, and communication is performed upon synchronizing a hopping pattern used in communication via a main unit and the hopping pattern used in direct communication between wireless telecommunication terminals.

23 Claims, 22 Drawing Sheets

FIG. 11 CNT-T

| CS | R | PRO | SYN | ID | UW | BF | MF | LCCHT | CRC |
|----|---|-----|-----|----|----|----|----|----|-----|
| 8 | 4 | 64 | 32 | 64 | 8 | 8 | 8 | 128 | 16 |

Rn

| CS | R | PR1 | UW | RV | B | CRC | GT |
|----|---|-----|----|----|---|-----|-----|
| 8 | 4 | 56 | 8 | 16 | 160 | 16 | 32 |

FIG. 12 Tn

| RV | PR1 | UW | RV | B | CRC | GT |
|----|-----|----|----|---|-----|-----|
| 12 | 56 | 8 | 16 | 160 | 16 | 32 |

FIG. 13 CNT-R

| CS | R | PR1 | UW | LCCHR | CRC | GT |
|----|---|-----|----|-------|-----|-----|
| 8 | 4 | 56 | 8 | 128 | 16 | 32 |

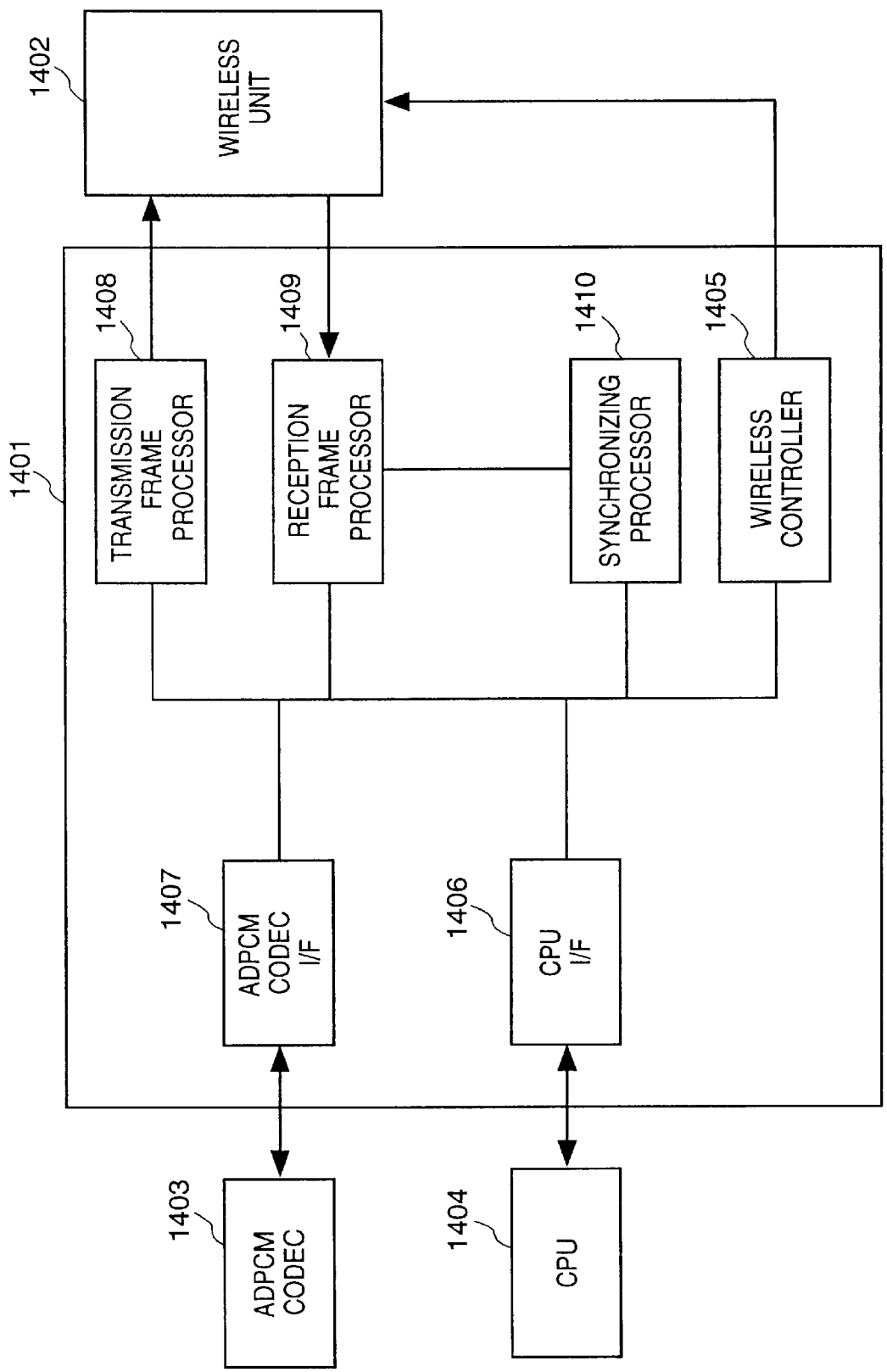

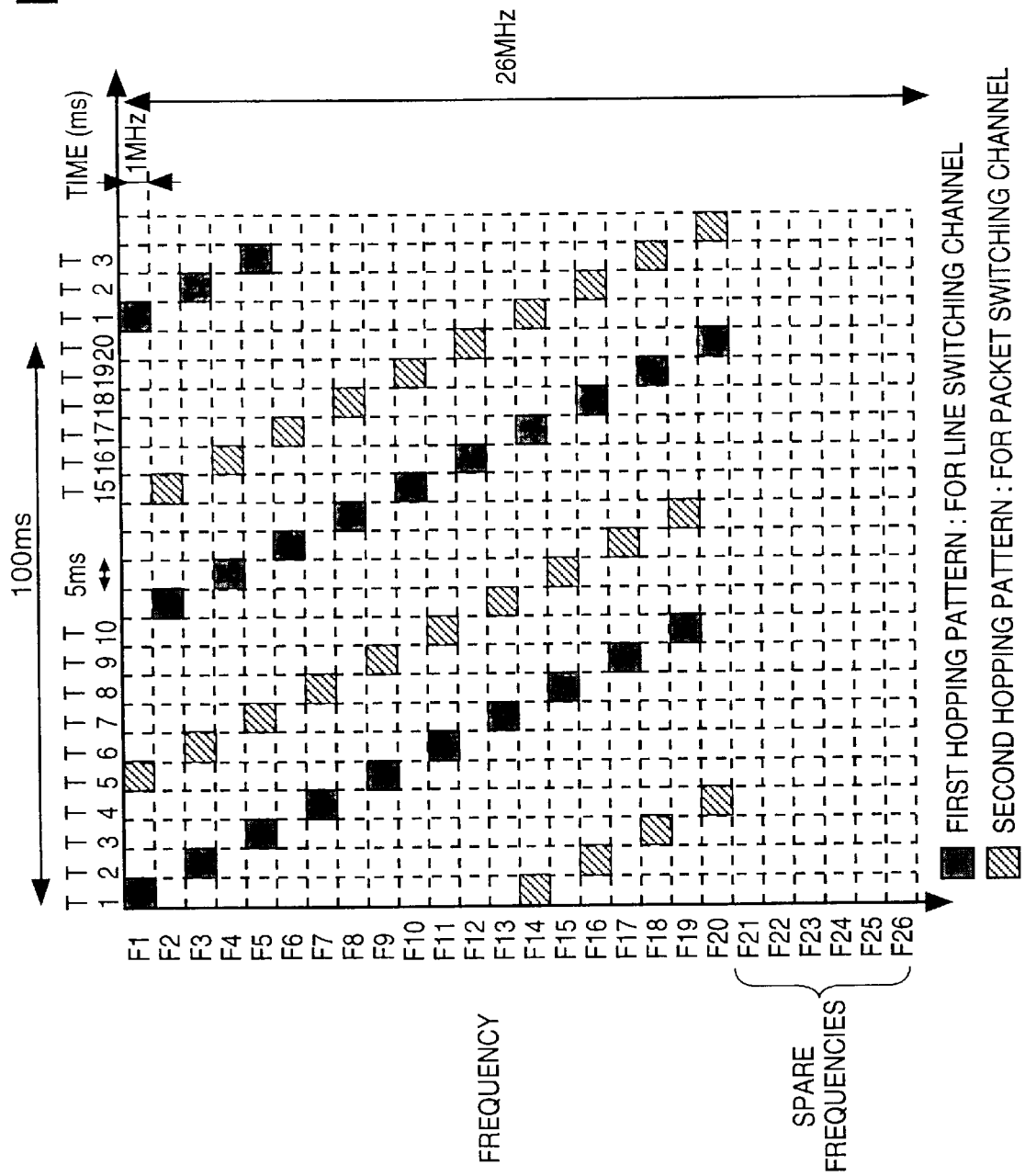

WIRELESS TELECOMMUNICATION SYSTEM USING FREQUENCY HOPPING, AND METHOD OF CONTROLLING SAME

BACKGROUND OF THE INVENTION

1. Field of the Invention

This invention relates to a wireless telecommunication system using frequency hopping, as well as to a method of controlling this system.

2. Description of the Related Art

In conventional wireless telecommunication systems, communication is performed via a public line or peer to peer between wireless terminals. The same is true with regard to wireless telecommunication systems that use frequency hopping.

A channel for line switching is used to perform communication via a public line, and a peer-to-peer channel is employed in peer-to-peer communication.

In a case where both a channel for line switching and a channel for peer-to-peer communication exist, the fact that the peer-to-peer channel is used for direct communication between the wireless terminals means that the line switching channel and the peer-to-peer channel cannot be synchronized, as a result of which the two channels interfere with each other when communication is performed. The same holds true in a situation where a plurality of peer-to-peer channels are used.

Further, the peer-to-peer channel is decided by the communicating wireless terminals when communication starts. This makes necessary a procedure through which the frequency that is to be used is decided in cooperation with the other terminal that is the party to communication. An unfortunate consequence is a decline in the effective speed of data transmission.

In regard to the procedure for deciding the peer-to-peer channel, it is necessary to use a specific frequency (a control frequency) for this procedure and the control frequency is used very often. This makes it impossible to achieve the uniform use of frequency that is required in frequency hopping.

SUMMARY OF THE INVENTION

Accordingly, an object of the present invention is to synchronize a channel for line switching and a peer-to-peer channel.

Another object of the invention is to so arrange it that a plurality of peer-to-peer channels will not interfere with one another.

Another object of the invention is to synchronize all channels used within a system.

A further object of the invention is to prevent a decline in effective data transmission speed.

A further object of the invention is to achieve uniform use of frequency.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 shows the composition of a CNT-T field used in the system according to the embodiment;

FIG. 12 shows the composition of a call channel used in the system according to the embodiment;

FIG. 13 shows the composition of a CNT-R field used in the system according to the embodiment;

FIG. 14 is a block diagram showing the architecture of a channel codec incorporated in a modem in the system according to the embodiment of the invention;

FIG. 15 is an explanatory view of frequency hopping used the system according to the embodiment of the invention;

DESCRIPTION OF THE PREFERRED EMBODIMENT (System Configuration)

Figure 1:
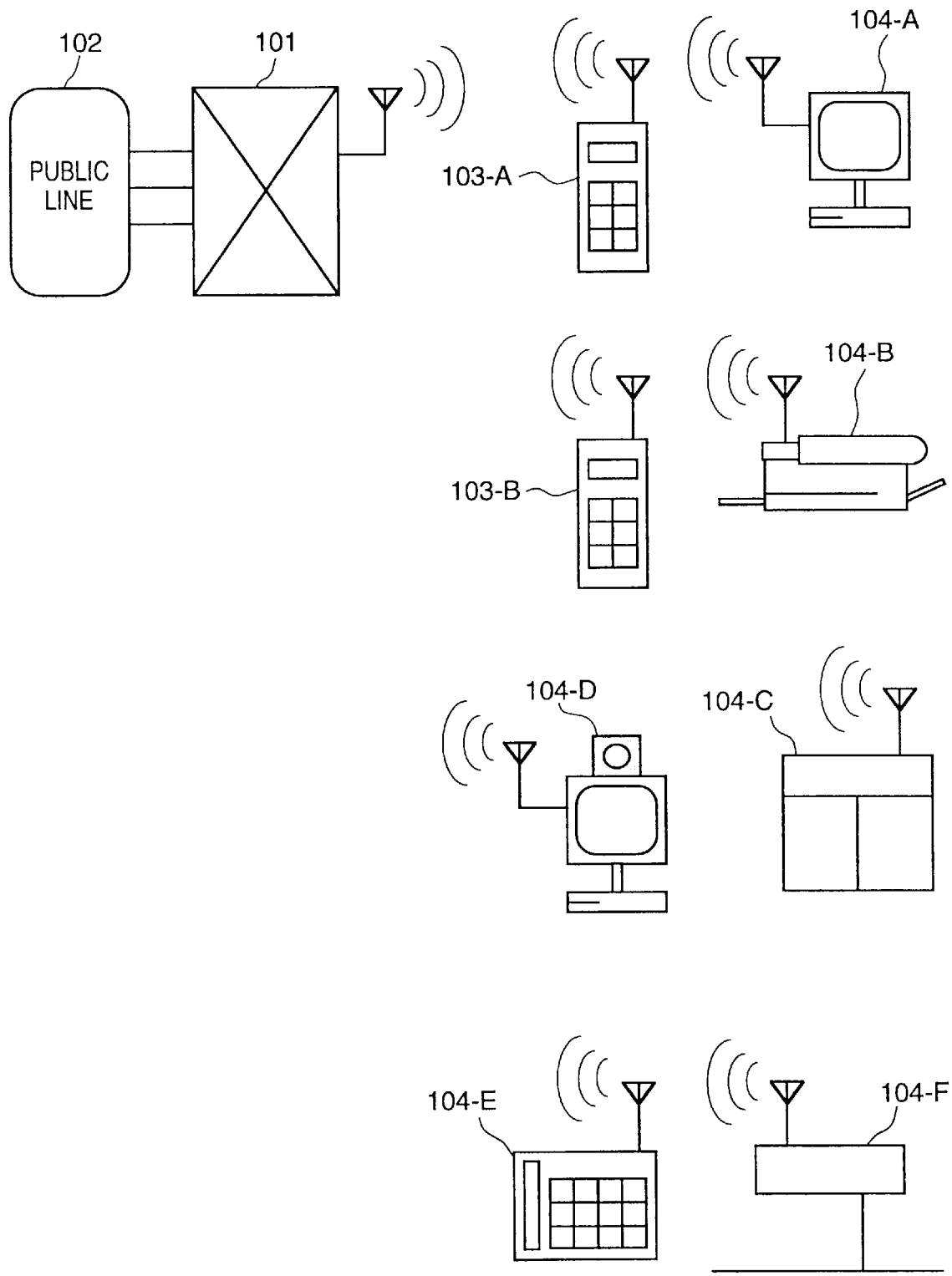
FIG. 1 is a diagram showing the configuration of a system according to an embodiment of the present invention.

FIG. 1 is a diagram showing the configuration of a system according to an embodiment of the present invention.

The system shown in FIG. 1 includes an exchange 101 accommodating a public line 102 and functioning as a centralized control station, a plurality of radiotelephones 103-A, 103-B for communication of control data and voice data with the exchange 101, and data terminal devices 104-A~104-F for communication of control data with the exchange 101 and direct communication of data with terminals.

A data terminal device in this embodiment is a device which is a combination of a terminal (data terminal) having a function for transmitting bursts of data in any amount and a wireless adapter for administering wireless communication between the data terminal and a main unit. Examples of data terminals are a computer 104-A, a printer 104-B, a copier 104-C, a TV conferencing terminal 104-D, a facsimile machine 104-E and a LAN bridge 104-F. Other examples (not shown) are electronic cameras, video cameras, scanners and various other terminals that execute data processing.

The radiotelephones and data terminals mentioned above are capable of communicating freely with one another and, at the same time, are capable of accessing a public switched telephone network. This is a major feature of this system. The details of construction and operation thereof will now be described.

<Construction of Main Unit>

Described first will be the construction of the main unit, which accommodates a public line.

Figure 2:
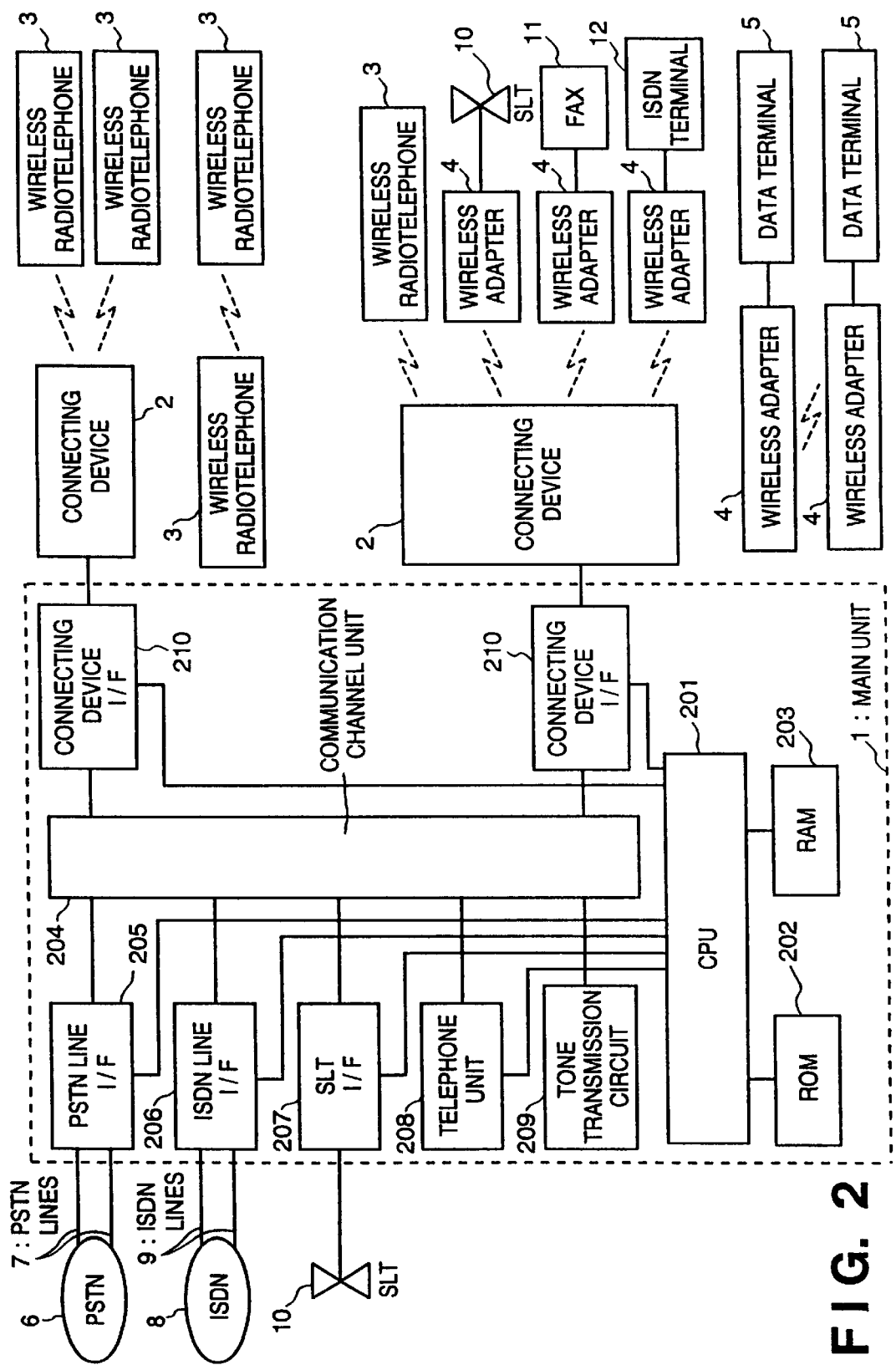
FIG. 2 is a block diagram showing the architecture of a main unit in a system according to the embodiment of the invention.

FIG. 2 is a block diagram showing the system configuration and the construction of a main unit according to the embodiment of the invention. A main unit 1, which is the principal component of this switching system, accommodates a plurality of outside lines and a plurality of terminals and is adapted to switch calls among these. In order that a wireless terminal (a radiotelephone below or a data terminal to which a wireless adapter has been connected) can be accommodated in the system, a connecting device 2 is placed under the control of the main unit 1 and wirelessly controls the wireless terminal to establish a wireless transmission link.

The radiotelephone 3 is a telephone for communicating, via the connecting device 2, with an outside line accommodated in the main unit 1, and for talking with extensions. A wireless adapter 4 is an adapter which, by being connected to a data terminal 5 such as a personal computer or printer, an SLT (single line telephone) 10, a facsimile machine (FAX) 11 and an ISDN terminal 12, makes it possible to transfer data wirelessly between similarly configured data terminals.

The main unit 1 accommodates a PSTN (an existing public switched telephone network) 6, which is one the networks providing outside lines. PSTN lines 7 are outside lines from the PSTN 6. An ISDN (Integrated Services Digital Network) 9 is one outside line network, and ISDN lines 9 are outside lines from the ISDN 8. The SLT is one terminal connected to the main unit 1.

The internal construction of the main unit 1 will now be described.

A CPU 201 lies at the heart of the main unit 1 and supervises overall control of the main unit, inclusive of control of switching. The control program of the CPU 201 is stored in a ROM 202. A RAM 203 stores various data such as data for control of the CPU 201 and data associated with frequency-hopping pattern which will be described later, and provides a work area for various computations. A communication channel unit 204 supervises the switching (by time division switching) of calls under the control of the CPU 201. A PSTN line i/f 205 performs PSTN line control, such as incoming call detection, transmission of destination-selection signal and DC loop closure, under the control of the CPU 201, in order to accommodate the PSTN lines 7.

Under the control of the CPU 201, an ISDN i/f 206 supports layer 1 and layer 2 of the ISDN for accommodating the ISDN lines and controls the ISDN lines. An SLT i/f 207 performs current feed, loop detection, selection signal reception and call-signal transmission under the control of the CPU 201 in order to accommodate the SLT 10. A telephone unit 208 has a handset, dialing keys, a talking circuit and a display, etc., for functioning as an extension radiotelephone under the control of the CPU 201 when power is supplied to the main unit, and for functioning as an SLT in the event of a power failure. A tone transmission circuit 209 transmits various tones, such as a touch-tone signal, dial tone and incoming call tone. A connecting device i/f 210 sends and receives a voice signal and control signal to and from the connecting device 2 under the control of the CPU 201 in order to accommodate the connecting device 2.

(Construction of Connecting device)

Figure 3:
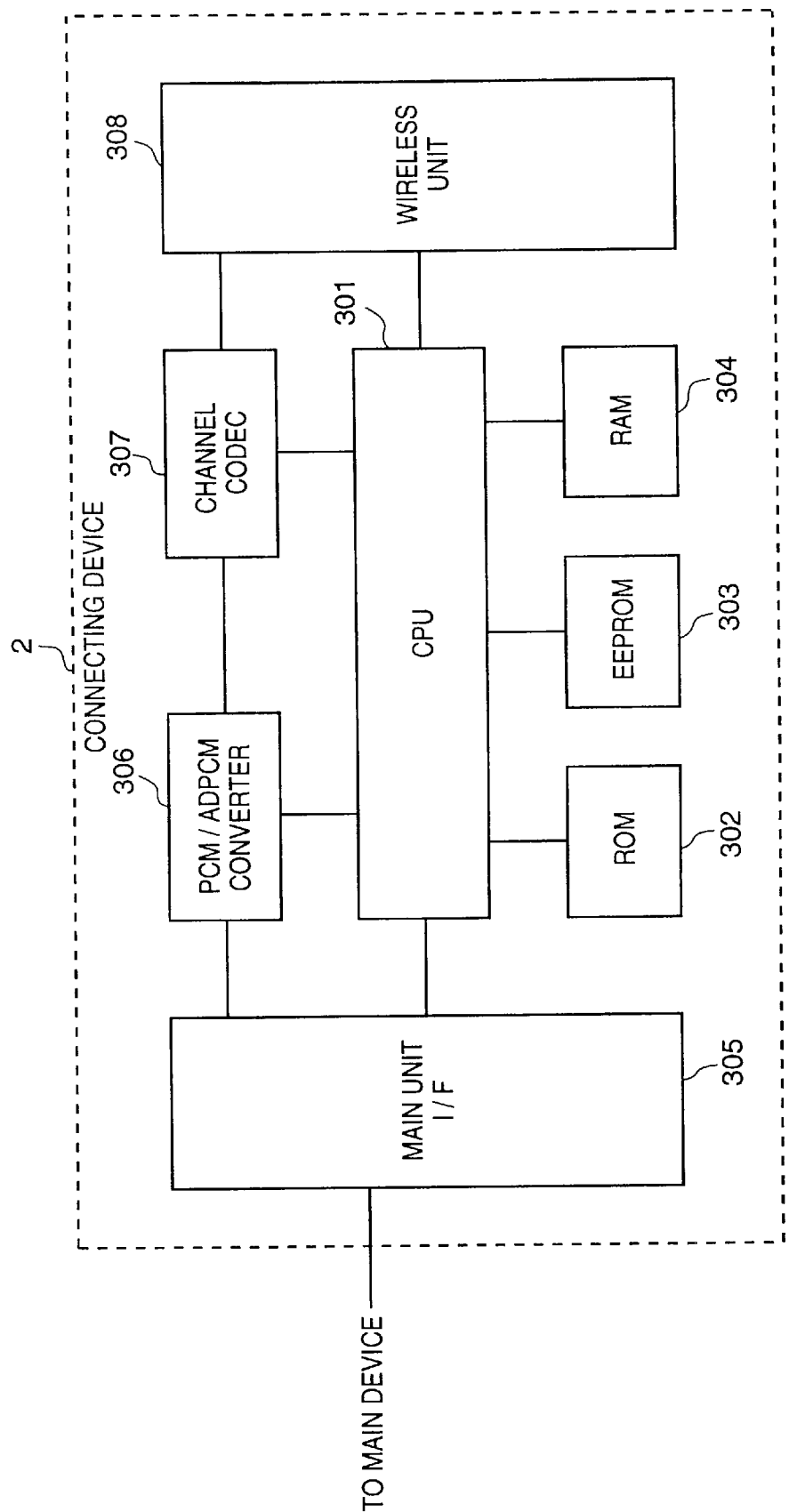
FIG. 3 is a block diagram showing the architecture of connection device in the system according to the embodiment of the invention.

FIG. 3 is a block diagram showing the construction of the connecting device 2. As shown in FIG. 3, the connecting device 2 has a CPU 301 for controlling the overall connecting device, inclusive of control of the communication channel and wireless portions. A ROM 302 stores the control program of the CPU 301, and an EEPROM 303 stores the call code (system ID) of the system. Furthermore, a RAM 304 stores various data for control of the CPU 301 and provides a work area for various computations. A main unit i/f 305 sends and receives a voice signal and control signal to and from the connecting device i/f 210 of the main unit 1 under the control of the CPU 301. A PCM/ADPCM converter 306, which is under the control of the CPU 301, converts a PCM (pulse code modulation)-coded speech signal from the main unit 1 to an ADPCM (adaptive differential pulse code modulation) code, transmits this code to a channel code 307 (described later), converts an ADPCM-coded voice signal from the channel codec 307 to a PCM code and transmits the PCM code to the main unit 1. Under the control of the CPU 301, the channel codec 307 applies processing such as scrambling to the ADPCM-coded speech signal and control signal and time-divisionally multiplexes these signals in predetermined frames. Under the control of the CPU 301, the wireless unit 308 executes processing in such a manner that the digital signal in the form of frames from the channel codec 307 can be modulated and wirelessly transmitted, and subsequently transmits the processed signals to an antenna. In addition, the wireless unit 308 demodulates a signal wirelessly received from the antenna and processes the signal to a digital signal in the form of frames.

(Construction of Radiotelephone)

Figure 4:
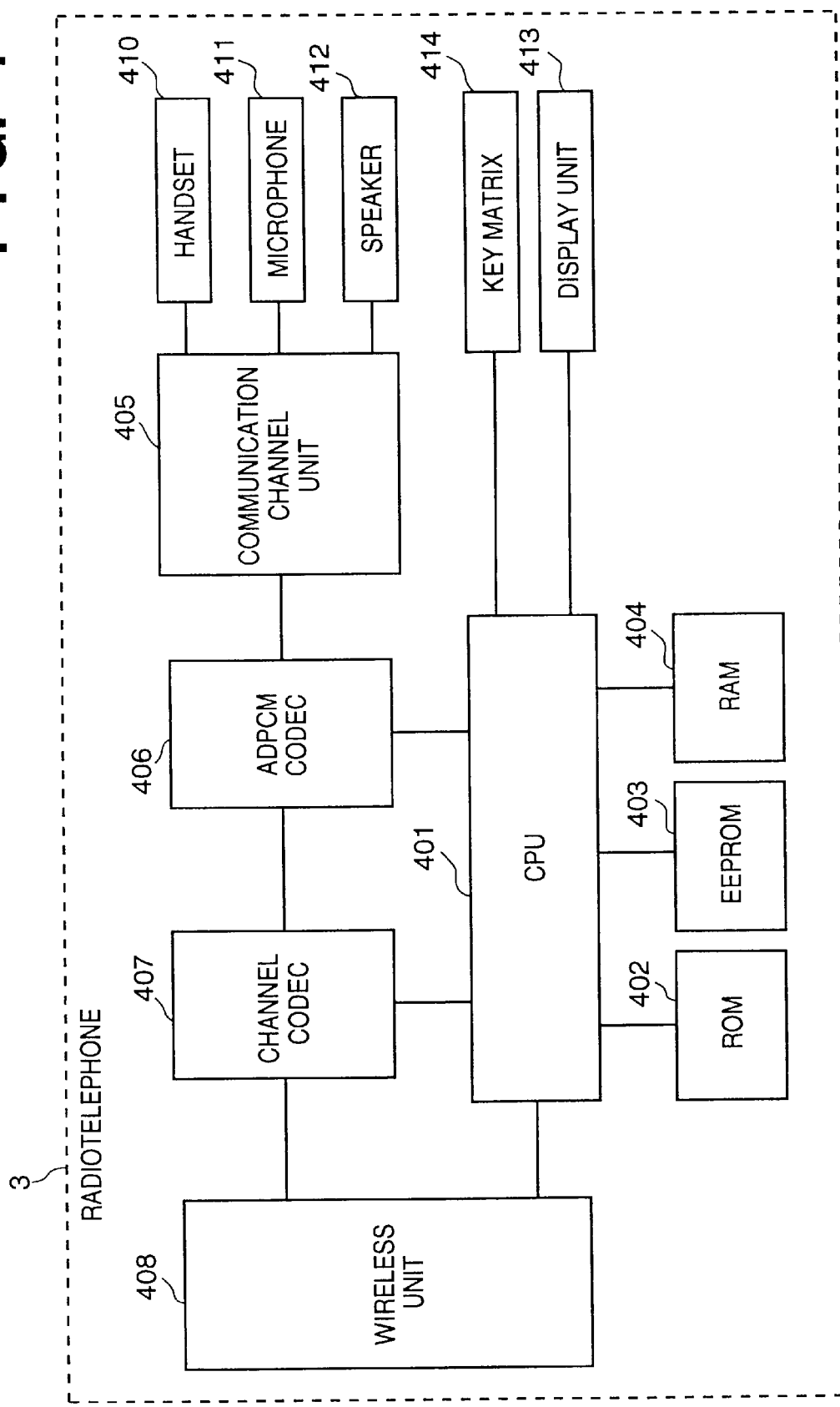
FIG. 4 is a block diagram showing the architecture of a radiotelephone in the system according to the embodiment of the invention.

FIG. 4 is a block diagram showing the construction of the radiotelephone 3. As shown in FIG. 4, the radiotelephone 3 has a CPU 401 for controlling the radiotelephone 3, inclusive of wireless control and call control. A ROM 402 stores the control program of the CPU 401, and an EEPROM 403 stores the call code (system ID) of the switching system and a sub-ID of the radiotelephone 3. A RAM 404 stores various data such as data for control of the CPU 401 and data associated with frequency-hopping pattern which will be described later, and provides a work area for various computations. A communication channel unit 405 inputs and outputs speech signals to and from a handset 410, microphone 411 and speaker 412 under the control of the CPU 401. Under the control of the CPU 401, an ADPCM codec 406 converts an analog voice signal from the communication channel unit 405 to an ADPCM code and transmits the code to a channel codec 407, described later. In addition, the ADPCM codec 406 converts an ADPCM-coded speech signal from the channel codec 407 to an analog voice signal and transmits the voice signal to the communication channel unit 405. Under the control of the CPU 401, the channel codec 407 applies processing such as scrambling to the ADPCM-coded speech signal and control signal and time-divisionally multiplexes these signals in predetermined frames. Under the control of the CPU 401, a wireless unit 408 executes processing in such a manner that the digital signal in the form of frames from the channel codec 407 can be modulated and wirelessly transmitted, and transmits the processed signals to an antenna. In addition, the wireless unit 408 demodulates a signal wirelessly received by the antenna and processes the signal to a digital signal in the form of frames. The handset 410 inputs and outputs voice signals in order that a system user may communicate, and the microphone 411 collects and enters voice signals. The speaker 412 receives a voice signal. A dialed number entered from a key matrix 414, the status of outside lines, etc., are displayed on a display unit 413. The key matrix 414 comprises dialing keys (not shown) for entering telephone numbers, outside line keys, a hold key and function keys such as a speaker key.

(Construction of Wireless Adapter)

Figure 5:
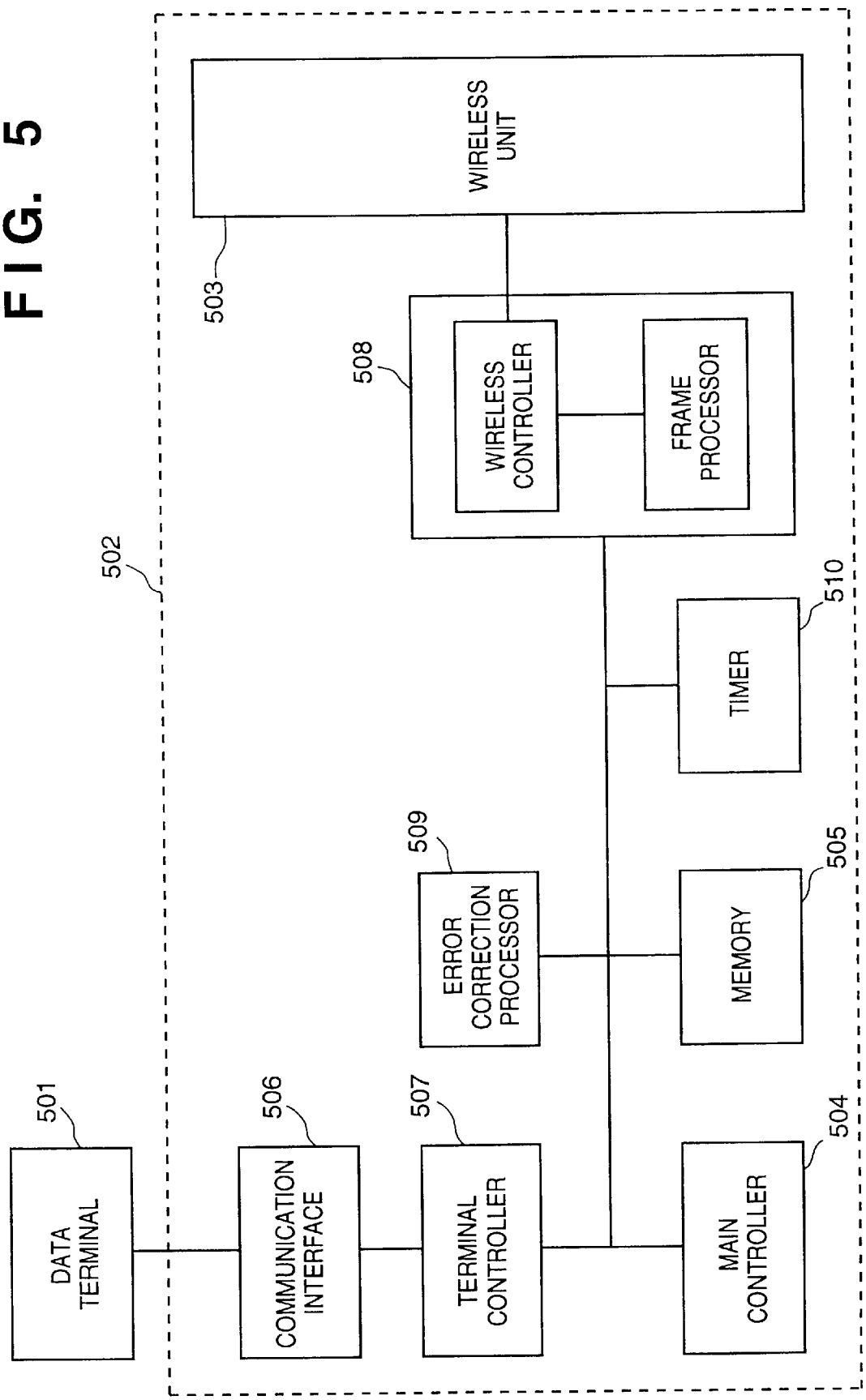
FIG. 5 is a block diagram showing the architecture of a wireless adapter in the system according to the embodiment of the invention.

FIG. 5 is a block diagram showing the internal construction of a wireless adapter 502 connected to a data communication terminal capable of being accommodated by the present system. In FIG. 5, a data terminal 501 is a terminal such as a personal computer, work station, printer or facsimile machine connected to the wireless adapter 502 via a communication cable or internal bus.

The wireless adapter 502 includes a wireless unit 503, a main controller 504 comprising a CPU, peripheral devices for interrupt control and DMA control, etc., and an oscillator for a system clock, etc., these units not being illustrated. The main controller 504 controls each of the blocks in the wireless adapter.

A memory 505 is constituted by, e.g., a ROM for storing the programs used by the main controller 504, and a RAM used as a buffer area for various processing.

A communication i/f unit 506 is a communication interface with which various data terminals, such as the above-mentioned data terminal 501, are provided as standard equipment. Examples are the RS-232C, the Centronics interface and the communication i/f of a LAN, the internal bus of a personal computer or work station, such as an ISA bus, or a PCMCIA i/f.

A terminal controller 507 supervises communication control of various types necessary when data is communicated between the data terminal 501 and wireless adapter 502 via the communication i/f 506.

A channel codec 508 performs frame processing and wireless control. Data that have been assembled into frames by the channel codec 508 are transmitted to the main unit or associated terminal via the wireless unit 503.

An error correction processor 509 is used to reduce bit error produced in data by wireless communication. At the time of transmission, the processor 509 inserts an error-correcting code in the data for communication. At the time of reception, the processor 509 calculates the error position and error pattern by processing and corrects the bit error contained in the received data. A timer 510 furnishes a timing signal used in each block within the wireless adapter 502.

Figure 6:
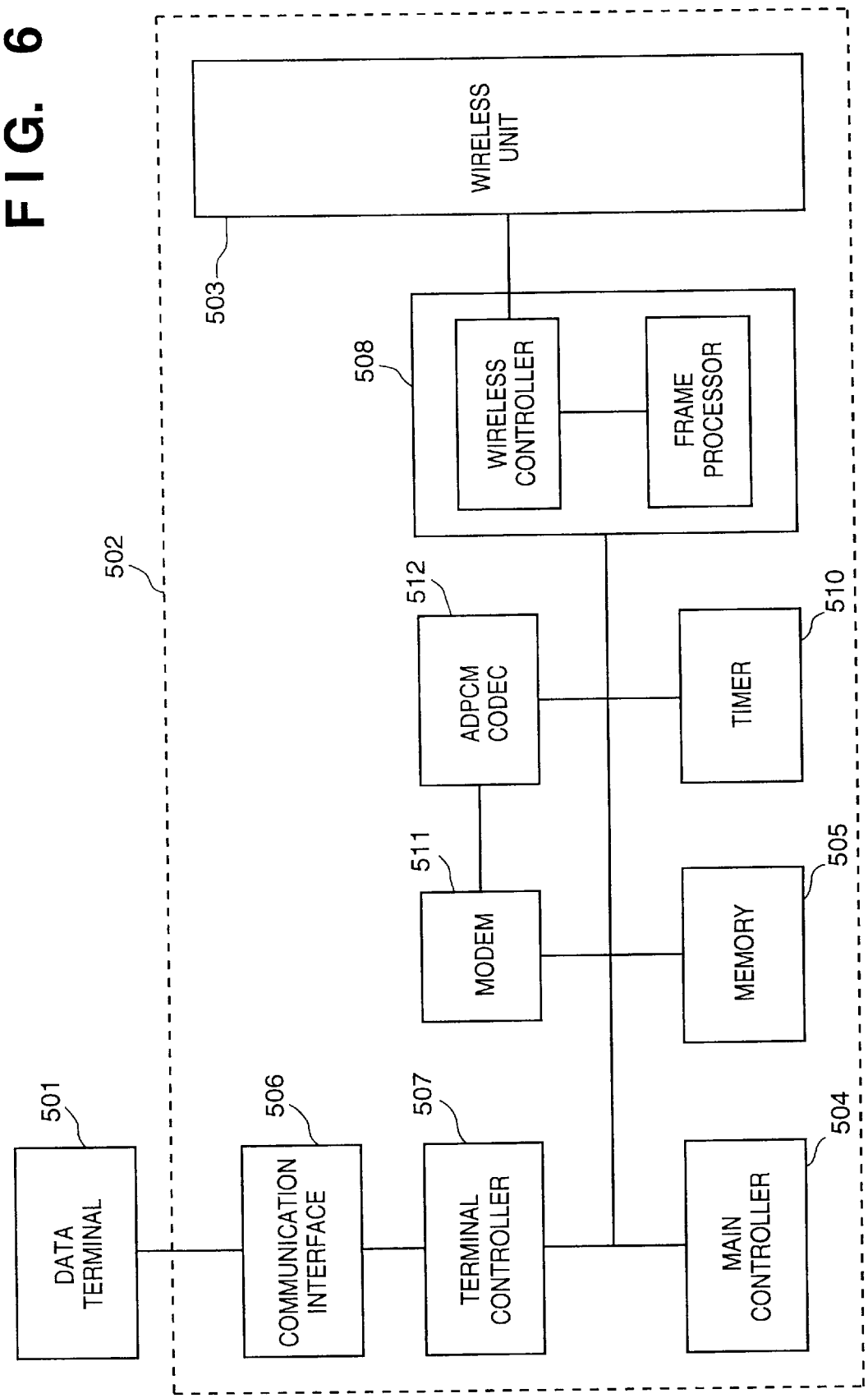
FIG. 6 is a block diagram showing the architecture of a wireless adapter, which has an internal modem, in the system according to the embodiment of the invention.

FIG. 6 is a block diagram showing the construction of a wireless adapter of the type having an internal modem. This is a wireless adapter necessary when transmitting data to a public line. As shown in FIG. 6, the wireless adapter 502 includes a modem 511 for modulating data to a voice band signal, and an ADPCM codec 512 for encoding the signal modulated by the modem 511. The ADPCM-coded data are assembled into frames by a channel codec and then transmitted to the main unit 1 via the wireless unit 503.

(Construction of Wireless Unit)

Figure 7:
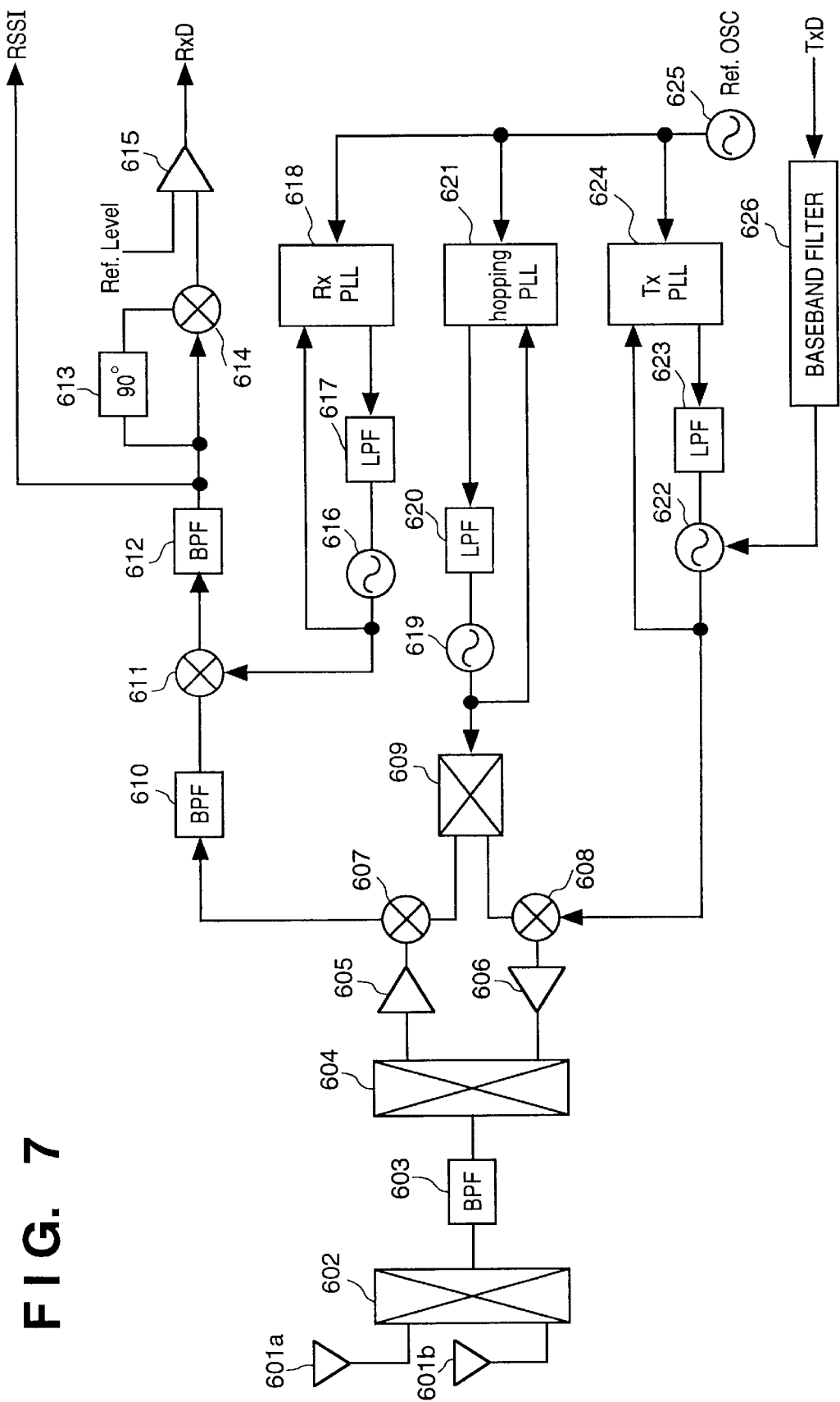
FIG. 7 is a diagram showing the architecture of a wireless unit in the system according to the embodiment of the invention.

FIG. 7 is a block diagram showing the construction of the wireless unit, which is common to the main unit, radiotelephones and data terminals of the system. As shown in FIG. 7, the wireless unit includes transceiver antennae 601a, b, a switch 602 for switching between the antennae 601a, b, a bandpass filter (hereinafter referred to as a "BPF") 603 for removing signals in unnecessary bands, a transceiver changeover switch 604, a receiving amplifier 605, a transmitting amplifier (equipped with power control) 606, a first IF (first intermediate frequency) down-converter 607, an up-converter 608, a transceiver changeover switch 609, a BPF 610 for removing unnecessary band signals from the down-converted signal obtained from the down-converter 607, and a second IF (second intermediate frequency) down-converter 611. The down-converters 607, 611 implement double-conversion reception.

The wireless unit further includes a second IF BPF 612, a 90° phase shifter 613 and a quadrature detector 614. The BPF 612 and 90° phase shifter 613 detect and demodulate the received signal.

Further provided are a waveshaping converter 615, a voltage-controlled oscillator (hereinafter referred to as a "VCO") 616 in the receiving loop, a low-pass filter (hereinafter referred to as an "LPF") 617, and a phase-locked loop (PLL) 618 constituted by a programmable counter, prescaler and phase comparator, etc. The VCO 616, LPF 617 and PLL 618 construct a frequency synthesizer in the receiving loop.

The wireless unit further includes a VCO 619 for generating a carrier signal, an LPF 620 and a PLL 621 constituted by a programmable counter, prescaler and phase comparator, etc. The VCO 619, LPF 620 and PLL 621 construct a frequency synthesizer for frequency hopping.

The wireless unit further includes a transmitting VCO 622 having a modulating function, an LPF 623, and a PLL 624 constituted by a programmable counter, prescaler and phase comparator, etc. The VCO 622, LPF 623 and PLL 624 construct a frequency synthesizer in the transmitting loop. The synthesizer has a frequency modulating function.

A clock 625 is the reference clock of each of the PLLs 618, 621 and 624, and a baseband filter 626 is a filter for limiting the band of the transmitted data (baseband signal).

The operation of the wireless unit will now be described.

(1) Operation at time of transmission

Digital data that have entered from an external circuit such as a processor has its bandwidth limited by the baseband filter 626, after which the data enter the modulating terminal of the VCO 622 in the transmitting loop.

The VCO 622 in the transmitting loop decides frequency based upon a control voltage output by the PLL 624 and LPF 623 of the transmitting loop and generates modulating waves of an intermediate frequency (IF) by direct modulation.

The intermediate-frequency (IF) modulating waves produced by the frequency synthesizer constructed by the VCO 622, LPF 626 and PLL 624 enter the up-converter 608, which adds this signal to the carrier signal generated by the frequency synthesizer constructed by the VCO 619, LPF 620 and frequency-hopping PLL 621. The resulting signal enters the amplifier 606 in the transmitting loop.

From the signal which has been amplified to a predetermined level by the amplifier 606 in the transmitting loop, signals in unnecessary bands are removed by the BPF 603, after which the signal is radiated into the air as radio waves from the antennae 601.

(2) Operation at time of reception

The BPF 603, removes signals in unnecessary bands from a signal received by the antennae 601, after which the signal is amplified to a predetermined level by the amplifier 605 in the receiving loop.

The received signal amplified to the predetermined level has its carrier removed by the down-converter 607 and is converted to a first intermediate frequency.

From the first intermediate frequency reception signal, signals in unnecessary bands are removed by the BPF 610, after which the signal enters the second down-converter 611 for the second intermediate frequency.

The down-converter 611 generates a signal having a second intermediate frequency based upon a signal produced by the frequency synthesizer, which is constructed by the VCO 606, LPF 617 and PLL 618 in the receiving loop, and the input signal from the first intermediate frequency down-converter.

The BPF 612 removes from the reception signal down-converted to the intermediate frequency signals in unnecessary bands, after which the signal enters the 90° phase shifter 613 and quadrature detector 614.

The quadrature detector 614 uses the signal phase-shifted by the 90° phase shifter 613 and the original signal to perform detection and demodulation.

Analog data demodulated by the quadrature detector 614 is wave-shaped as digital data by the converter 615 and then output to an external circuit.

(Wireless Frame)

FIGS. 8 through 13 illustrate the frame architectures of wireless frames used in this system.

Three different frames are used in this system, namely a frame (referred to as a "PCF" below) for communication between the main unit and radiotelephones, a frame (referred to as a "PPF") for communication between radiotelephones, and a burst-data frame (referred to as a "BDF" below). The PCF and PPF are line switching channels and are used when real-time data such as audio and video data are transmitted. The BDF is a packet switching channel and is used when peer-to-peer data are communicated between data terminals. The details of the data contained in these frames will now be described.

Figure 8:
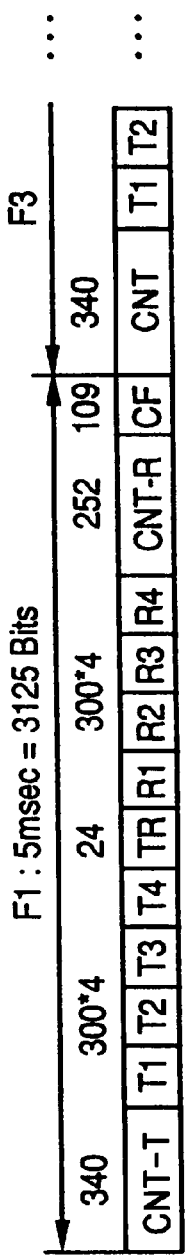
FIG. 8 shows the format of a frame for communication between a wireless terminal and a main unit used in the system according to the embodiment.

FIG. 8 illustrates the PCF. As shown in FIG. 8, CNT-T is a control field having a frame synchronizing signal and logical control information, T1~T4 are voice channels sent to four different radiotelephones, R1~R4 are voice channels sent from four different radiotelephones, CNT-R is a control field which includes logical control information sent from a wireless terminal to the main unit, and CF is frequency changeover time. Further, F1 and F3 in FIG. 8 represent frequency channels used when the above-mentioned frame is wirelessly transmitted. These indicate that the frequency channel is changed every frame.

Figure 9:
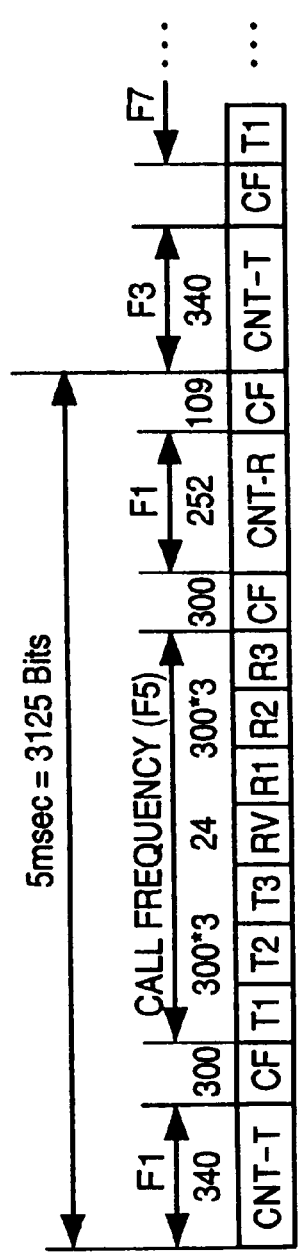
FIG. 9 shows the format of a frame for communication between wireless terminals used in the system according to the embodiment.

FIG. 9 illustrates the PPF. As shown in FIG. 9, CNT-T is a control field having a frame synchronizing signal and logical control information, T1~T3 and R1~R3 are call channel fields used in calls among three different radiotelephones, CNT-R is a control field which includes logical control information sent from a wireless terminal to the main unit, and CF is frequency changeover time. Further, F1, F3, F5 and F7 in FIG. 9 represent frequency channels used when the above-mentioned frame is wirelessly transmitted. Unlike the case with the PCF, communication between radiotelephones is performed by accepting the logical control information LCCH-T from the main unit over the frequency channel F1 and then changing over the frequency channel to F5, which is provided for communication between radiotelephones. Thereafter, the frequency channel is changed over to F3, logical control information is accepted from the main unit and the frequency channel is changed over to F7, which is provided for communication between radiotelephones. This procedure is repeated until communication between radiotelephones ends.

Figure 10:
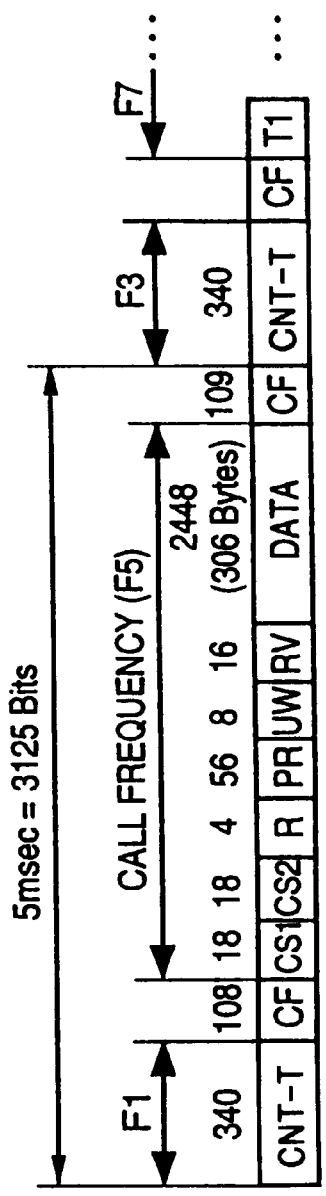
FIG. 10 shows the format of a frame for communication between data terminals used in the system according to the embodiment.

FIG. 10 illustrates the BDF. As shown in FIG. 10, CNT-T is a control field having a frame synchronizing signal and logical control information, CS is carrier sensing time for controlling contention between terminals, R is ramp time, PR is a preamble transmission field, UW is a unique word for achieving byte synchronization, DATA is a data field and CF represents frequency changeover time. In FIG. 10, F1, F3, F5 and F7 indicate frequency channels used when the above-mentioned frame is wirelessly transmitted. Unlike the case with the PCF, communication between radiotelephones is performed by accepting the logical control information from the main unit over the frequency channel F1 and then changing over the frequency channel to F5, which is reserved for communication between radiotelephones. Thereafter, the frequency channel is changed over to F3, logical control information is accepted from the main unit and the frequency channel is changed over to F7, which is reserved for communication between radiotelephones. This procedure is repeated until burst-data communication ends.

FIG. 11 illustrates the CNT-T field. As shown in FIG. 11, CS represents a carrier sensing field, R ramp time, PRO a 64-bit profile for achieving bit synchronization, SYN a 32-bit frame synchronizing signal, ID a 64-bit system call signal, UW a unique word, BF a basic frame number field, MF a multiframe number field, LCCHT logical control information transmitted from the main unit to a wireless terminal, and CRC a cyclic redundancy check of the CNT-T field. The. numerals in FIG. 11 indicate the numbers of bits in this embodiment.

FIG. 12 shows the voice-channel frame. Since T1~T4 and R1~R4 are common in terms of constitution, the voice channels for transmission are indicated collectively by Tn and the voice channels for reception are indicated collectively by Rn. Further, Tn and Rn are identical in composition. In FIG. 12, the frame includes a preamble PR1 for each slot, a unique word UW, 32-kbps B-channel information B, a CRC for the voice channel, guard time GT and reserve bit RV.

FIG. 13 shows the frame architecture of the logical control channel CNT-R. Here LCCHR indicates logical control information sent from a wireless terminal to the main unit.

(Channel Codec)

The above-mentioned frames are processed by a codec, the internal construction of which is shown in FIG. 14. As shown in FIG. 14, a channel codec 1401 is connected to a wireless unit 1402, an ADPCM codec 1403 incorporated in a radiotelephone or wireless adapter, and a CPU 804 of a radiotelephone or wireless adapter. The channel codec 1401 includes a wireless controller 1405 for controlling changeover between transmission and reception with regard to the wireless unit, and for controlling frequency hopping. The wireless controller 1405 also functions to detect the carrier prior to data transmission. A CPU I/F 1406 is an interface for exchanging control information with the CPU. The I/F 1406, which has an internal register for storing the states of various components in an ASIC (application-specific integrated circuit) as well as operating mode, controls each component in the ASIC in conformity with the control signal from the CPU and the status of each component of the ASIC. The codec includes an ADPCM codec i/f 1407 which exchanges serial data and a synchronizing clock with the ADPCM codec for the purpose of exchanging voice signals. A transmission frame processor 1408 assembles signals from the ADPCM codec and logical control data entered from the CPU in the transmission frame illustrated in FIGS. 8 through 13. A reception frame processor 1409 extracts control information and voice data from a signal frame sent from the wireless unit and delivers the control information and voice data to the ADPCM codec i/f and CPU i/f. A synchronizing processor 1410, which is constituted by a DPLL (delay phase-locked loop), reproduces the clock from the received signal and implements bit synchronization.

The basic operation of the ASIC will now be described.

(1) Transmission

Control information appended to a transmission data frame is accepted from the CPU by way of the CPU i/f. In a case where the ASIC is used by a radiotelephone and by the connecting device within the main unit, a transmission frame is assembled by the transmission frame processor together with the data from the ADPCM codec. In a case where the ASIC is used by a data terminal, a transmission frame is assembled by the transmission frame processor together with error-correction coded burst data. The data are scrambled when the frame is assembled. This is necessary in order to maintain DC balance at the time of wireless transmission. At the moment the received signal ends, the wireless controller places the wireless unit in the transmitting mode following sensing of the carrier and delivers the transmission frame to the wireless unit.

(2) Reception

The wireless controller changes over the wireless unit to reception at the moment the data to be transmitted end and waits for the reception frame. When the reception frame is received, the wireless controller descrambles the data and extracts control information and data from the reception frame. This control information is delivered to the CPU through the CPU i/f.

In a case where the received frame is a PCF or PPF, the received data are delivered to the ADPCM codec i/f. If the ASIC is used in a radiotelephone, the data is output as audio via the ADPCM codec. If the ASIC is used in the main unit, the data is sent to the speech channel.

In a case where the received frame is a BDF, the received data is transferred to a memory within data terminal.

(3) Handling of logical control data (3-1) At time of wireless communication

The system stands by at the frequency allocated by the main unit in advance and the LCCH-T sent periodically from the main unit is received. The LCCH sent from the main unit contains information for verifying whether a call has been terminated on an outside line and whether there is a call originating request on the side of the radiotelephone. The radiotelephone sends the CPU the LCCH extracted by the reception frame processor. Thereafter, the designated LCCH to be sent from the CPU to the main unit is sent to the main unit as LCCH-R. Thus, the radiotelephone repeats the above-described procedure until an outgoing call or incoming call is generated.

(3-2) At time of communication

A case in which a radiotelephone A originates a call will be described as an example.

Assume that the radiotelephone A is exchanging the LCCH with the main unit on the frequency channel F1 at the time of wireless communication. The radiotelephone A monitors the LCCH from the main unit on the frequency channel F1 through the procedure, described in (3-1) above, until an outgoing call is generated. When the outgoing call is generated at the radiotelephone A, the latter places an outgoing-call request in the LCCH-R, which is to be sent to the main unit, through the procedure set forth in (3-1) above, and sends the LCCH-R to the main unit. The LCCH from the main unit which indicates whether communication is possible is judged by the LCCH sent on the frequency channel F1 100 ms later.

If the content of the LCCH from the main unit following the origination request indicates that connection is not possible because all lines are occupied, the radiotelephone A so notifies the user that the lines are busy.

If the content of the LCCH from the main unit following the origination request indicates that connection is possible, a time slot of the voice channel used for speech in the same LCCH-T is designated. For example, if "1" is designated, this indicates that communication is performed using T1 and R1.

(Frequency-hopping Pattern)

FIG. 15 is a diagram showing the concept of frequency hopping used in this system.

In the system according to this embodiment, use is made of 26 frequency channels having a width of 1 MHz, utilizing a frequency band of 26 MHz. If consideration is given to cases in which there are frequencies that cannot be used because of interference noise, 20 frequency channels are selected from the 26 channels and frequency hopping is carried out over the selected frequency channels in a predetermined order.

In this system, one frame of communication data has a length of 5 ms and frequency channels are hopped every frame. Consequently, the length of the period of one hopping pattern is 100 ms.

In FIG. 15, hopping patterns for a line switching channel and hopping patterns for a packet switching channel are distinguished from each other by shading of different kinds. Thus, patterns in which the same frequencies are not used at the same times are employed by being split between the line switching channel and the packet switching channel. As a result, it is possible to prevent the occurrence of data errors.

In a case where a plurality of connecting devices are accommodated, different hopping patterns are used by the connecting devices in order to avoid interference between the connecting devices. This is a characterizing feature of this invention. This method makes it possible to realize a system having a multicell architecture, as a result of which a wide service area can be obtained.

(Details of Operation)

In this system, as described above, frames are assembled in order to perform communication between the main unit and radiotelephones or data terminals and between the terminals per se, and control is performed in such a manner that the frequency used is changed over at fixed time intervals.

The concrete operation of the system will now be described in detail with regard to a number of scenarios.

(1) Basic Operation Procedure

In this system, the manner in which a hopping pattern is set for a line switching channel differs from that in which a hopping pattern is set for a packet switching channel.

In a case where a line switching channel is used, as when a call is made to a public line, time slots and frequency hopping patterns to be used are decided whenever a line is connected, by employing logical control information (LCCH-T and LCCH-R), which is time-divisionally multi-plexed within frames, in order to acquire a channel. More specifically, when an originating terminal sends an origination request command to the main unit, the main unit decides the hopping pattern and time slot for the line switching channel and notifies this terminal.

With regard to the packet switching channel, the terminal sends a hopping pattern request for the packet switching channel to the main unit after power is introduced, and the main unit gives notification of the hopping pattern. The terminal stores this hopping pattern and, if this packet switching channel is used from this point onward, assumes that this hopping pattern will be used at all times.

Immediately after power is introduced, the terminal does recognize the hopping pattern for the exchange with the logical control channel. Accordingly, the terminal stands by at any frequency and receives a frame at this frequency. When the frame is received, the frequency information of the next frame contained in this frame is accepted and frequency hopping is started from this point onward. In a case where a plurality of connecting devices are being used, the hopping pattern used by the connecting device that could receive the frame first is followed up.

Further, immediately after start-up by introduction of power, which terminals will be allocated to what frequencies is not yet decided. At start-up, therefore, an ID is registered for each terminal and logical control channel frequencies are allocated in the setting mode.

When a logical control channel is allocated, each terminal is placed in an intermittent reception state and only logical control data destined for the terminal itself is received. Data for transmission to the main unit is transmitted to the main unit using the LCCH-R of the allocated frequency only in a case where data for transmission to the main unit has been generated.

Operation at start-up by introduction of power, operation at origination of a call on an outside line, and operation at the time of peer-to-peer data transmission will now be described.

(2) Operation (setting mode) at introduction of power to main unit (connecting device) and wireless terminal This mode is for registering IDs and for setting the frequencies of logical control channels used.

Figure 16:
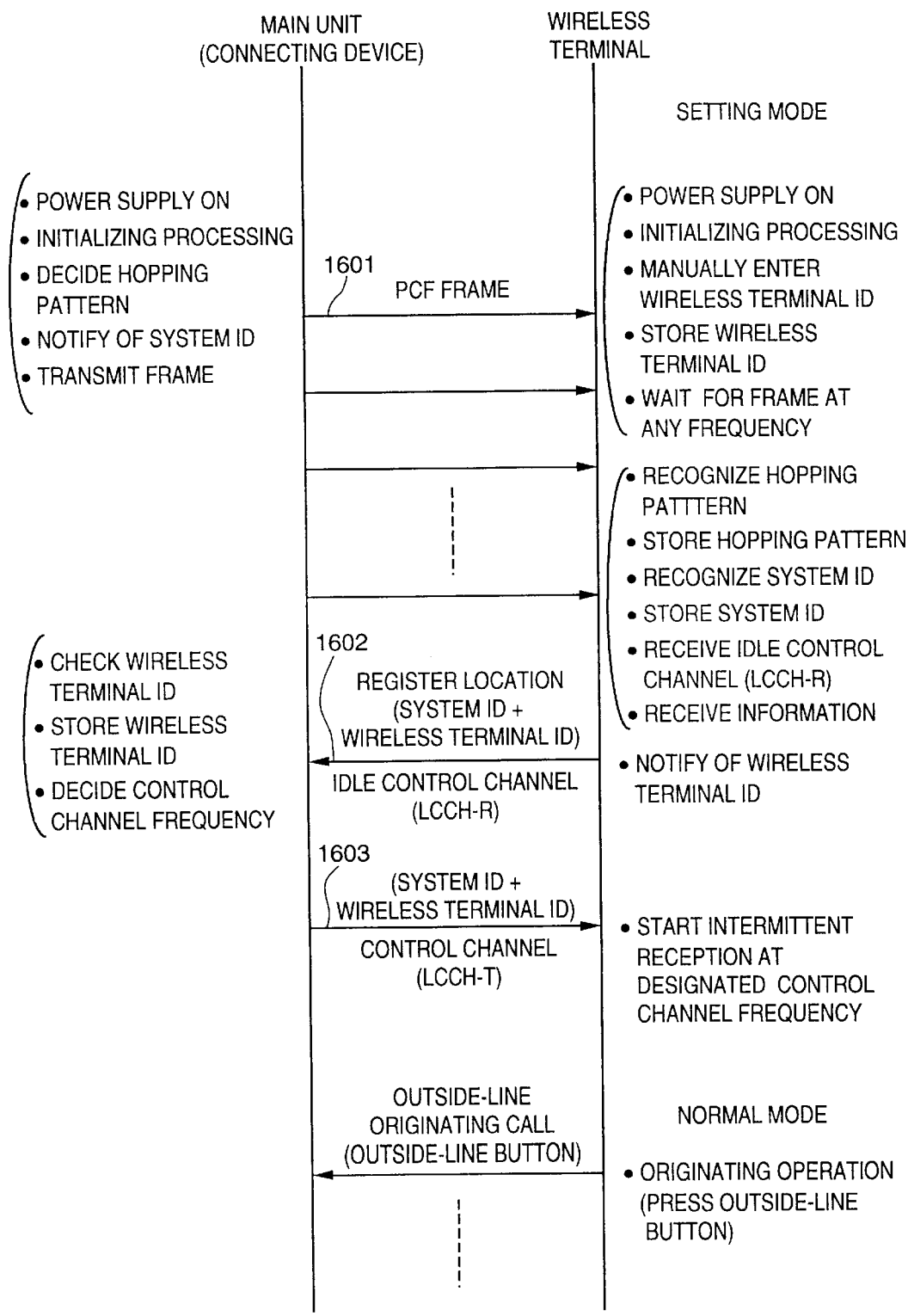
FIG. 16 shows a sequence executed when power is introduced to the system embodying the present invention.
Figure 17:
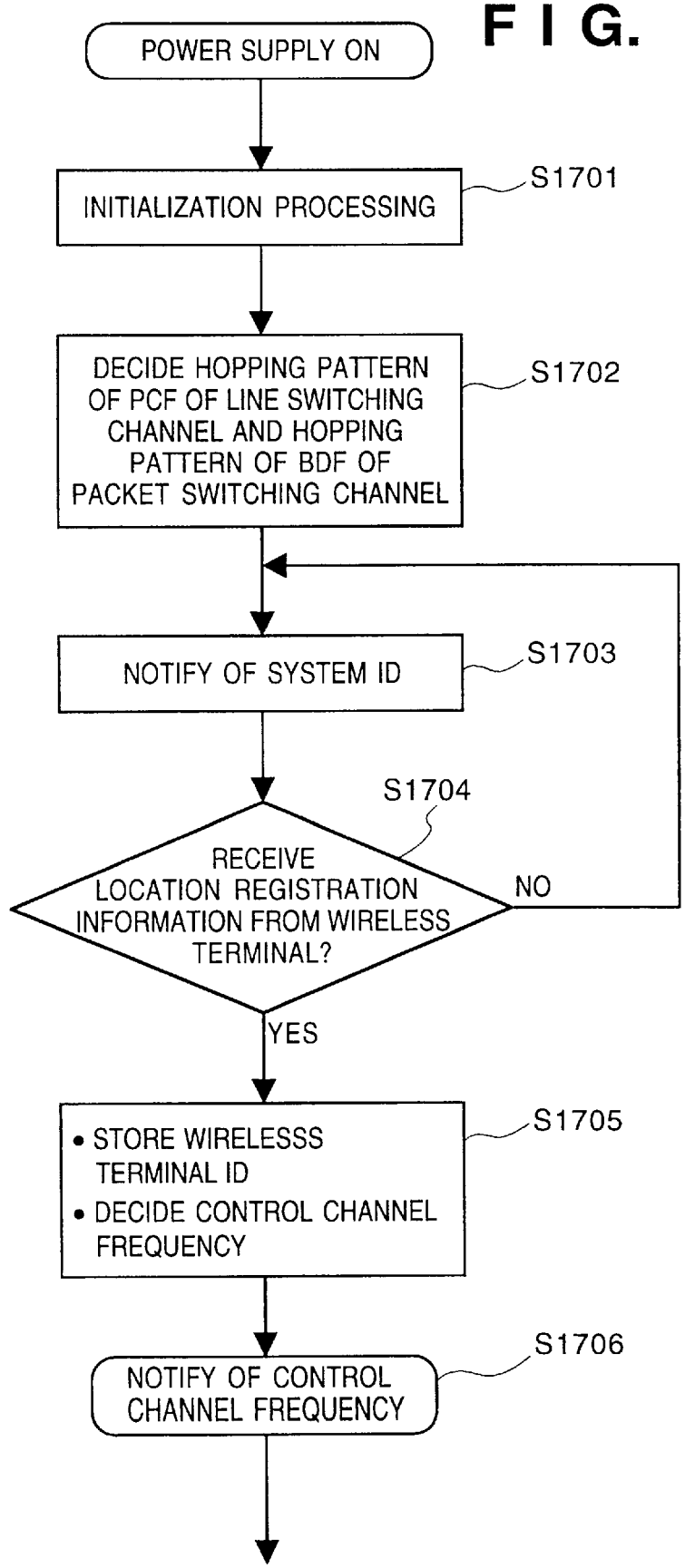
FIG. 17 is a flowchart of operation performed when power is introduced to a main unit in the system embodying the present invention.
Figure 18:
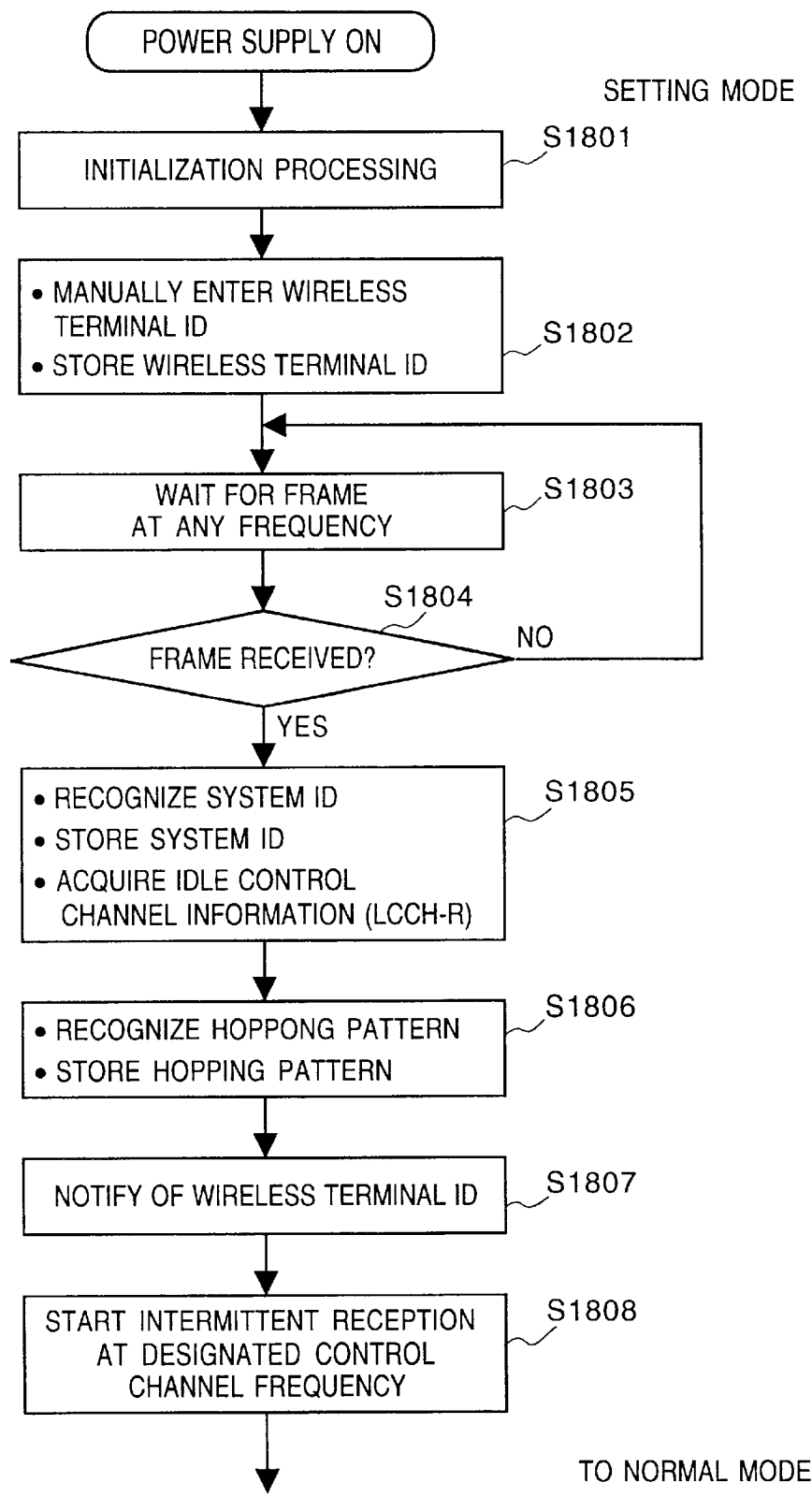
FIG. 18 is a flowchart of operation performed when power is introduced to a wireless terminal in the system embodying the present invention.

FIG. 16 is a sequence diagram showing operation when power is introduced to the main unit (connecting device) and a wireless terminal in the present invention, FIG. 17 is a flowchart showing operation when power is introduced to the main unit according to the present invention, and FIG. 18 is a flowchart showing operation when power is introduced to the wireless terminal according to the present invention.

(1) Operation at introduction of power to main unit (connecting device)

When a power-supply switch on the main body of the main unit 1 (connecting device 2) shown in FIG. 1 is closed, the main unit 1 (connecting device 2) initially sets the main body at step S1701 in FIG. 17. Next, the hopping pattern of frequency hopping for the PCF of the line switching channel over which the exchange of logical control data is performed and the hopping pattern of BDF of the packet switching channel synchronized to the frequency hopping pattern of PCF for peer-to-peer data communication are decided at step S1702. Next, at step S1703, the above-mentioned hopping pattern (the frequency hopped to in the next unit of time) and the PCF frame to which the ID of this system has been appended are transmitted to the wireless terminals 103, 104. At this time the CNT-T portion of the PCF frame includes the system IF and the information relating to the frequency hopped to in the next unit of time according to the above-mentioned hopping pattern. The CNT-R portion contains information relating to an idle control channel capable of being used on the side of the wireless terminal.

Next, when the main unit 1 (connecting device 2) determines that information for location registration such as the system ID and wireless terminal ID from the wireless terminal 103 has been received ("YES" at step S1704), the IDs of the wireless terminals 103 and 104 are stored and the control channel for transmitting the wireless communication control information addressed to the wireless terminals 103, 104 is decided at step S1705. The wireless terminals 103, 104 are so notified at step S1706.

(2) Operation at introduction of power to wireless terminal

When the power-supply switch on the main body of the wireless terminals 103, 104 is closed, the setting mode is established on the main body of the wireless terminals 103, 104 at step S1801 in FIG. 18. Next, the IDs of the wireless terminals 103, 104 are manually entered at step S1802 and the wireless terminals 103, 104 store these IDs.

When the PCF frame of the line switching channel is received from the main unit 1 (connecting device 2) at step S1803, a transition is made to a state in which reception at an arbitrary frequency is awaited. Next, if the PCF frame from the main unit 1 (connecting device 2) could be received at step S1804, the program proceeds to step S1805. Here the system ID is recognized from the ID field (see FIG. 11) in the PCF frame, the system ID is stored in memory, and the idle channel information (the frequency for transmitting the PCF frame of the line switching channel from the wireless terminal to the main unit) is acquired from the LCCHR field (see FIG. 13). Further, the hopping pattern sent from the main unit as logical control data is recognized and stored (step S1806).

When the hopping pattern and system ID are ascertained, the wireless terminals 103, 104 transmit the frame to which the system ID and the ID information of the wireless terminals 103, 104 themselves have been appended to the main unit using the idle control channel obtained from the LCCHR field (step S1807).

If the information designating the control channel frequency is received from the main unit 1 (connecting device 2) after the above-mentioned processing, intermittent reception is started (step S1808) on the designated control channel and a transition is made from the setting mode to the normal mode.

Figure 19:
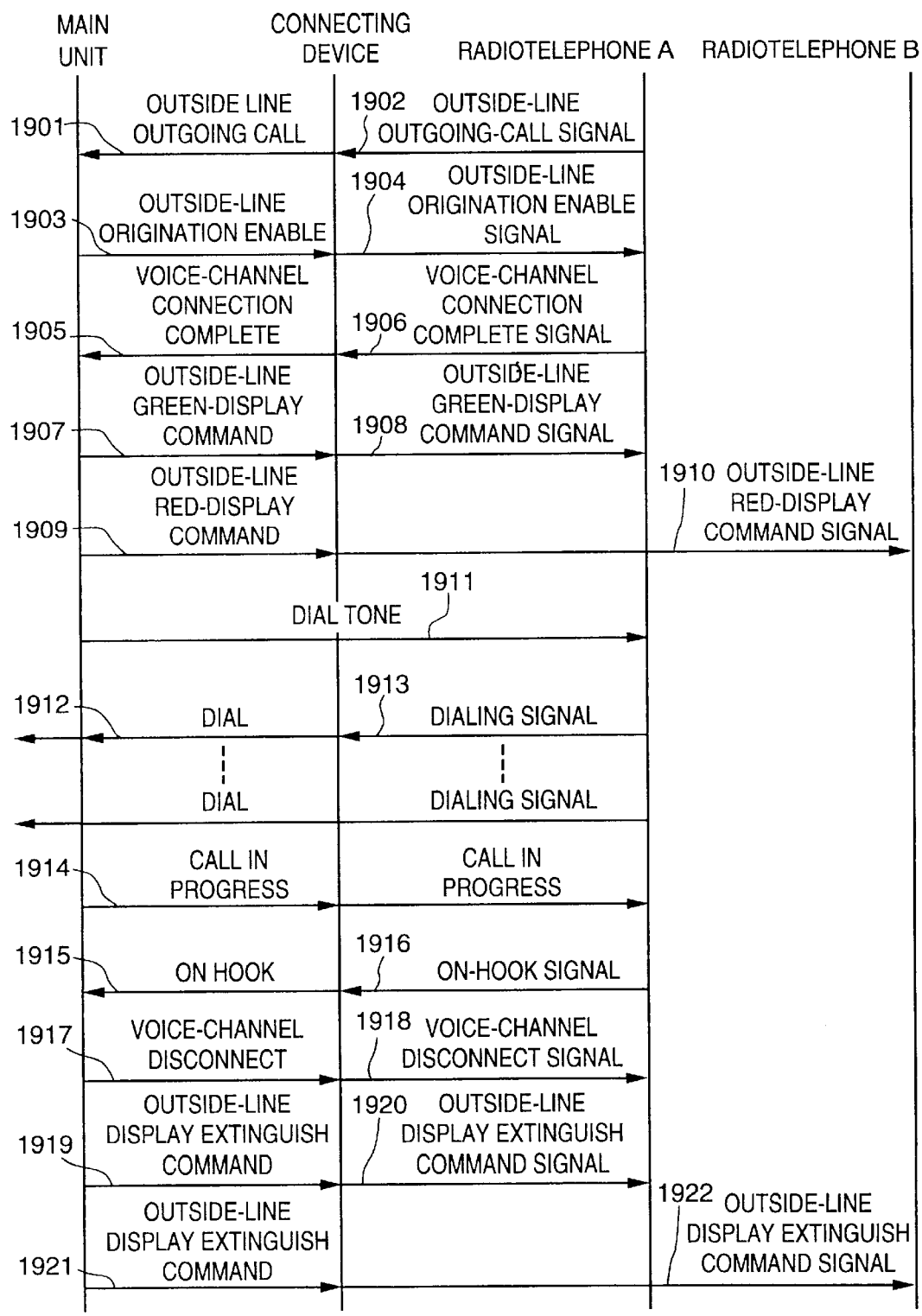
FIG. 19 shows a sequence executed when a call is originated on an outside line in the system embodying the present invention.
Figure 20:
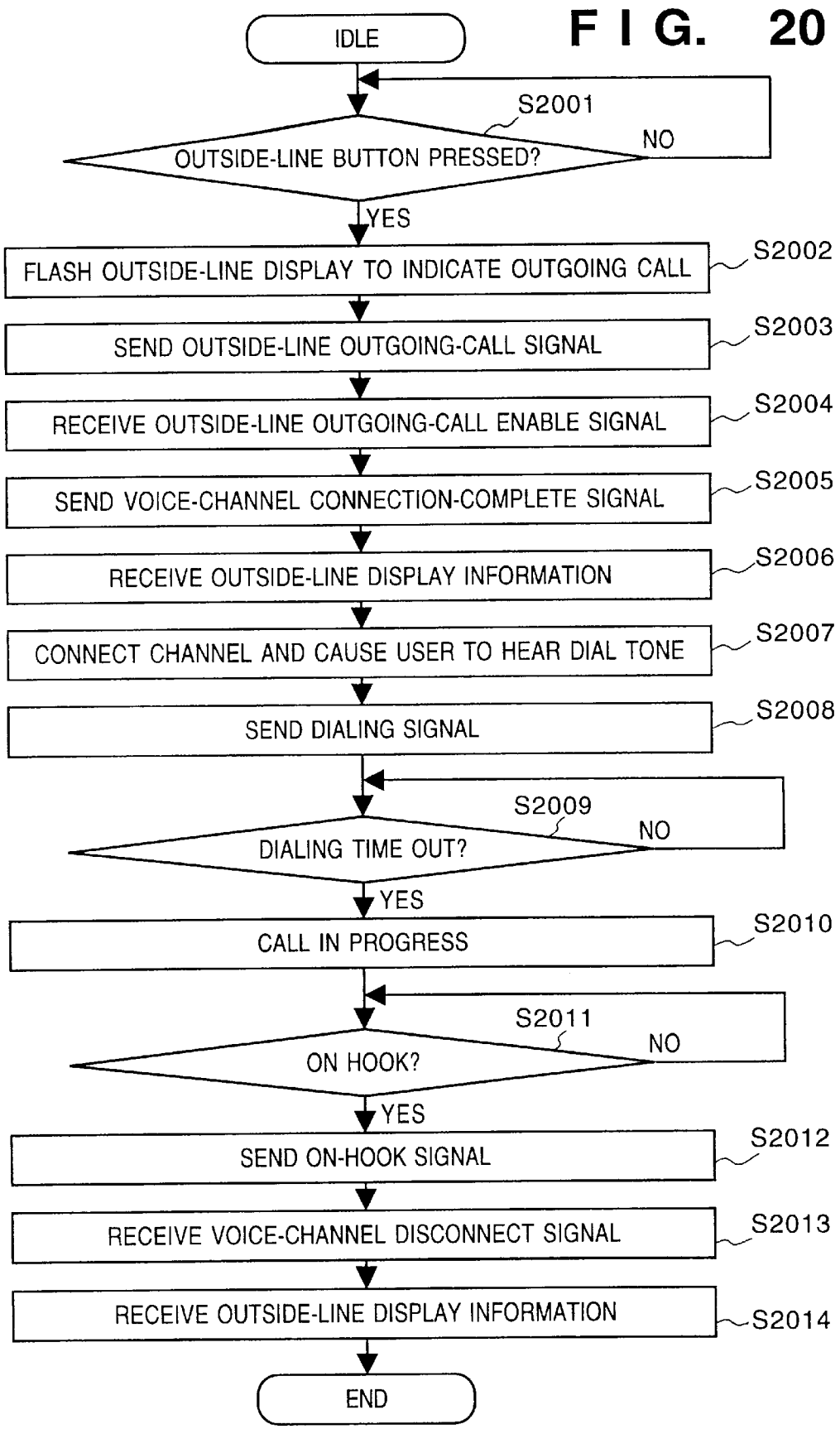
FIG. 20 is a flowchart of operation of the main unit when a call is originated on an outside line in the system embodying the present invention.
Figure 21:
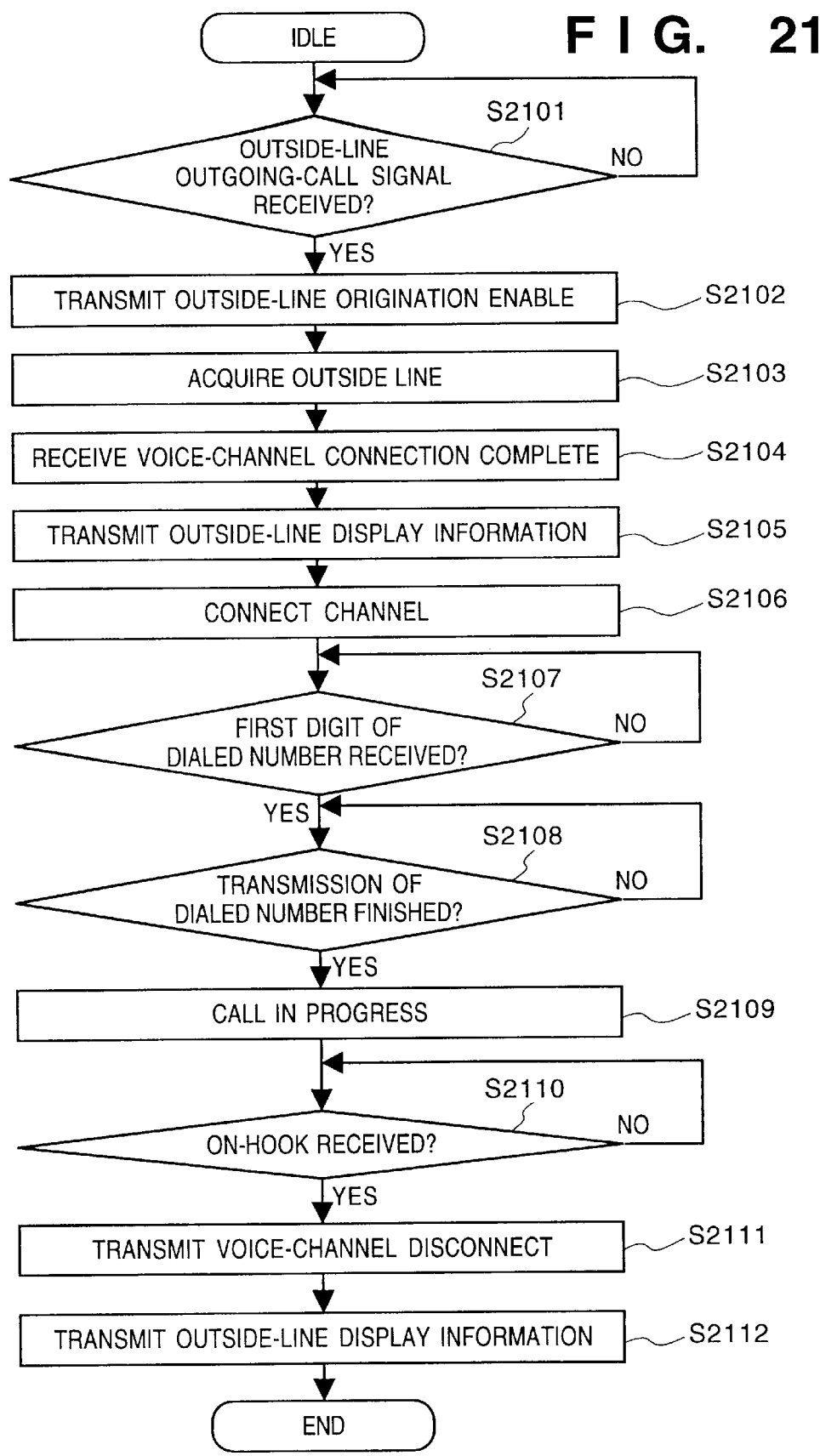
FIG. 21 is a flowchart of operation of a radiotelephone when a call is originated on an outside line in the system embodying the present invention.

(3) Processing for originating outgoing call on outside line from radiotelephone FIG. 19 is a sequence diagram showing origination of a call on an outside line according to the invention, FIG. 20 is a flowchart showing the operation of the radiotelephone 3 when a call is originated on an outside line, and FIG. 21 is a flowchart showing operation of the main unit 1 when a call is originated on an outside line.

When an outside-line key belonging to the key matrix 414 on the radiotelephone 3 of this embodiment is pressed (step S2001), the radiotelephone 3 causes an outside line LED on the display unit 414 corresponding to the pressed outside-line key to flash to indicate an outgoing call (step S2002) and transmits an outside-line outgoing-call signal (1902) to the main unit 1 via the connecting device 2 (step S2003). This outside-line outgoing-call signal is transmitted by way of the LCCH-R in the PCF frame of the line switching channel of FIG. 8 using the wireless link between the radiotelephone 3 and connecting device 2. The connecting device 2 notifies the main unit of this signal by means of the main unit i/f 305.

Upon receiving the outside-line outgoing-call signal (1901), the main unit 1 determines whether origination of a call on the outside line is possible (S2101). If the outside line is idle and the call is capable of being originated, the main unit 1 decides the outside line for originating the call and which voice channel (T1~T4, R1~R4) of the PCF frame is to be used. The main unit 1 transmits outside-line origination enable (1903), in which the number of the decided voice channel is a parameter, to the radiotelephone 3 via the connecting device 2 (S2102) and acquires the outside line (S2103). Outside-line origination enable is transmitted by the LCCH-T of the PCF frame.

Upon receiving a signal (1904) indicative of outside-line origination enable (S2004), the radiotelephone 3 establishes synchronization with the voice channel designated by the parameter sent with the outside-line origination enable signal. When the transition to the voice channel by the radiotelephone 3 is completed, the radiotelephone 3 transmits a signal (1906) indicating that connection of the voice channel is completed (S2005). At the moment outside-line origination enable is received from the main unit 1, the connecting device 2 receives the predetermined voice channel by the channel codec 307, creates a path for delivering this to the main unit 1 and communicates voice-channel connection completion (1905) from the radiotelephone 3 to the main unit 1.

Upon receiving the voice-channel connection complete (1905) (step S2104), the main unit 1 judges that preparations on the side of the radiotelephone have been made and sends the connecting device 2 an outside-line green-display command (1907) in order to light the outside-line LED in the color green (step S2105). In addition, the main unit 1 effects connection of a channel with the acquired outside line (step S2106). The radiotelephone 3 receives an outside-line green-display command signal (1908) (step S2006), lights the outside-line LED in the color green, connects the channel internally and causes the user to hear a dial tone (1911) (step S2007). In order that outside-line LEDs on radiotelephones other than the radiotelephone 3 that placed the outgoing call on the outside line will be lit in the color red, the main unit 1 transmits an outside-line red-display command (1909). Next, the radiotelephone 3 at which the dialing operation has been performed at the key matrix 414 transmits a dialing signal (1913) to the main unit 1 (S2008). The end of the dialing operation is monitored by time-out (S2009). When time-out is reached, call-in-progress is established (S2010). When the first digit of dialing (1912) is received (S2107), the main unit 1 begins transmitting the dialing signal to the outside line and monitors the transmission by time-out (S2108). When transmission of the dialed number ends, call-in-progress is established (S2109).

When the call ends and the radiotelephone 3 is hung up ("YES" at step S2011), an on-hook signal (1916) is sent to the connecting device 2 (S2012). When on-hook (1915) is transmitted to the main unit 1 ("YES" at step S2110), the main unit 1 transmits voice-channel disconnect (1917) (S2111). Furthermore, the main unit 1 cancels the allocation of the voice channel to the radiotelephone 3. In order to extinguish the outside-line LED of the radiotelephone 3, the main unit 1 transmits outside-line display extinguish commands (1919, 1921) (step S2112). Upon receiving a voice-channel disconnect signal (1918), the radiotelephone 3 releases the channel (S2013) and extinguishes the corresponding outside-line LED based upon the received outside-line display extinguish command signals (1920, 1922) (step S2014).

Thus, it is possible to originate a call on an outside line using a line switching channel. When an origination request is made to the main unit, a communication channel capable of being used will have been allocated. This represents a characterizing feature of the invention.

(4) Processing when extension call is originated from radiotelephone (processing when use is made of PPC for line switching channel)

A case will be assumed in which two radiotelephones being managed by the same connecting device (i.e., two radiotelephones for which the intervening connecting device is the same when communication is performed with the main unit) make an extension call. The operation of the radiotelephone on the originating side and the operation of the radiotelephone on the terminating side will be described in detail in such case.

Figure 22:
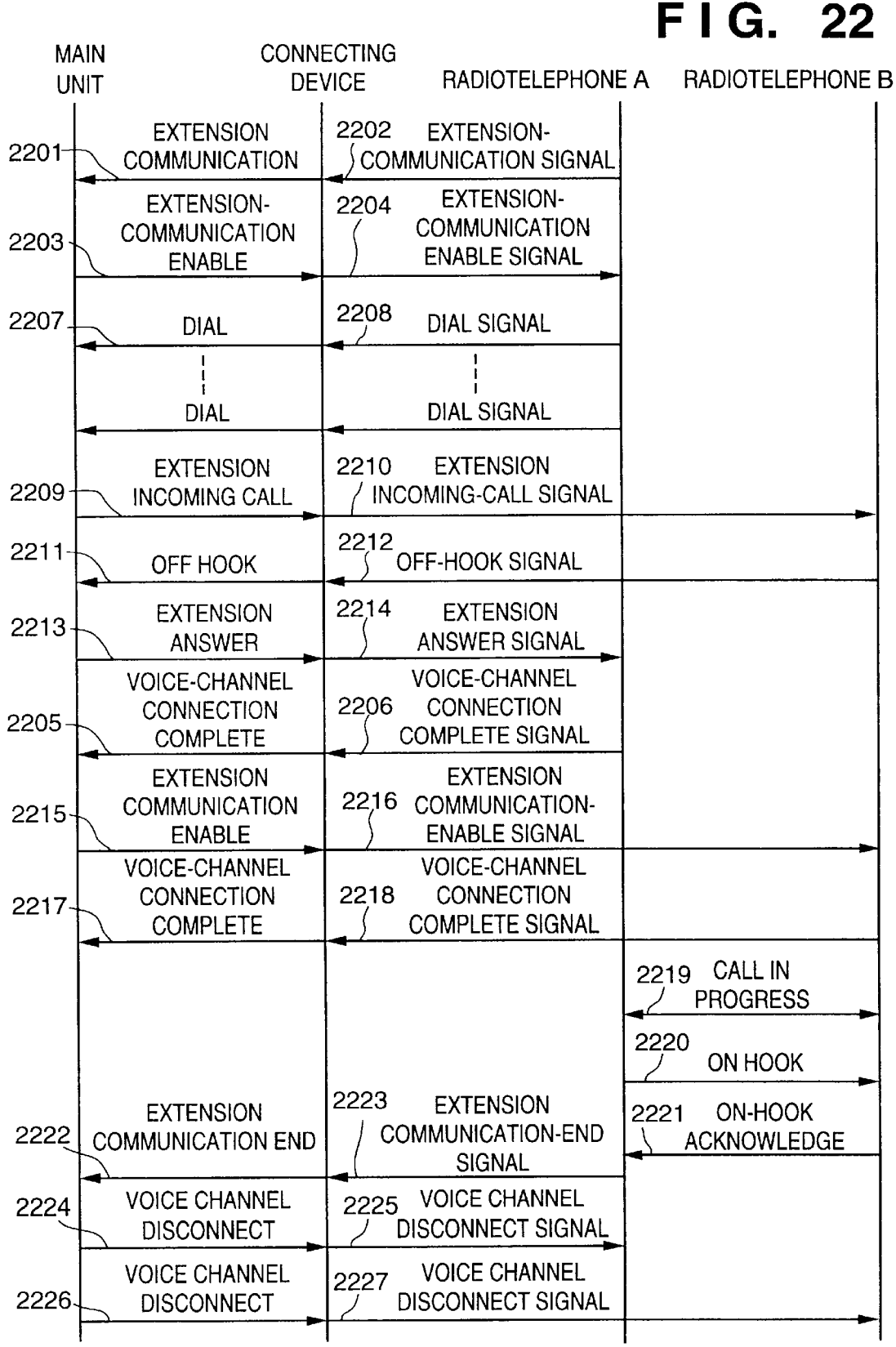
FIG. 22 shows an extension communication sequence in the system embodying the present invention.
Figure 23:
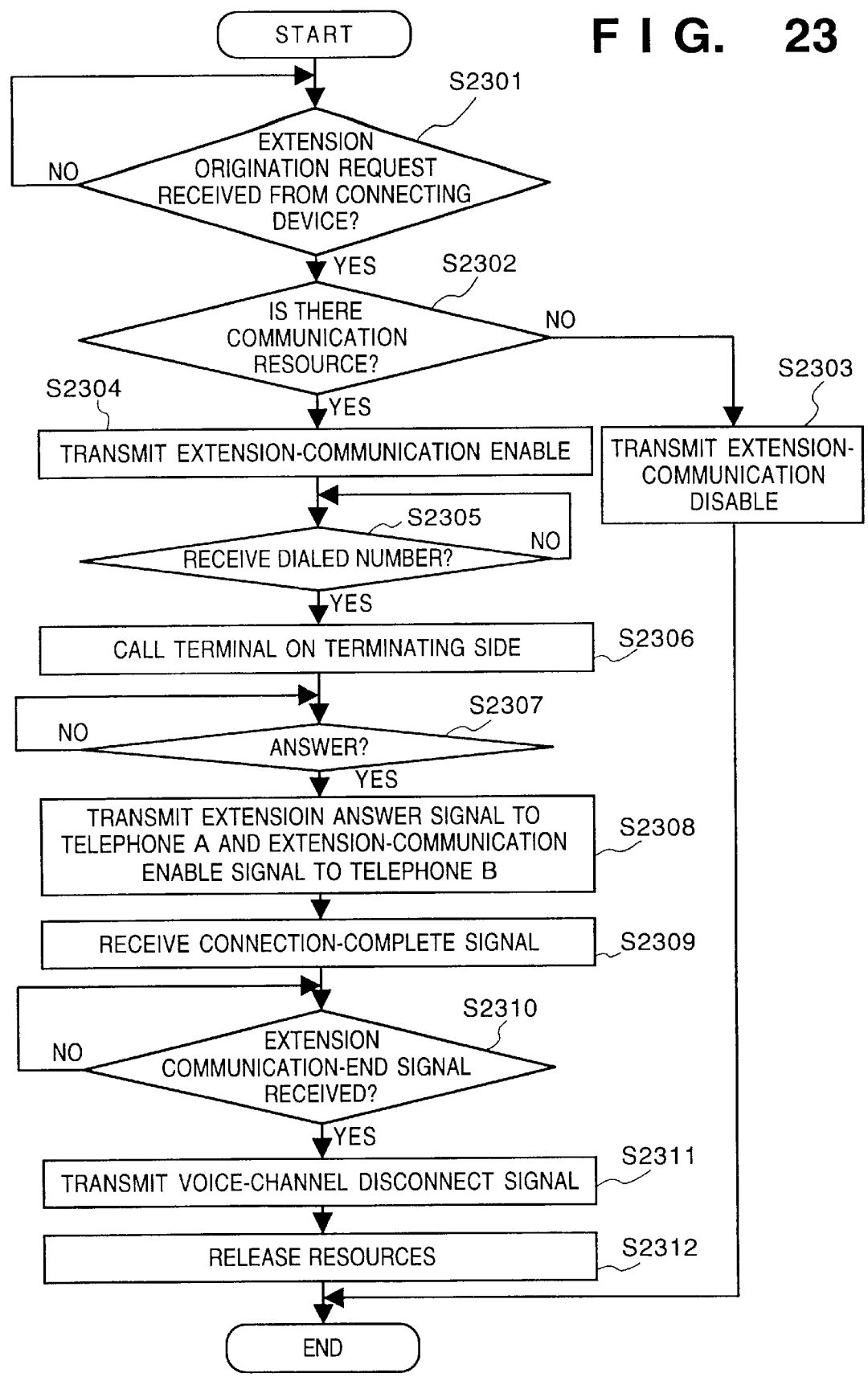
FIG. 23 is a flowchart of operation of the main unit at the time of extension communication in the system embodying the present invention.
Figure 24:
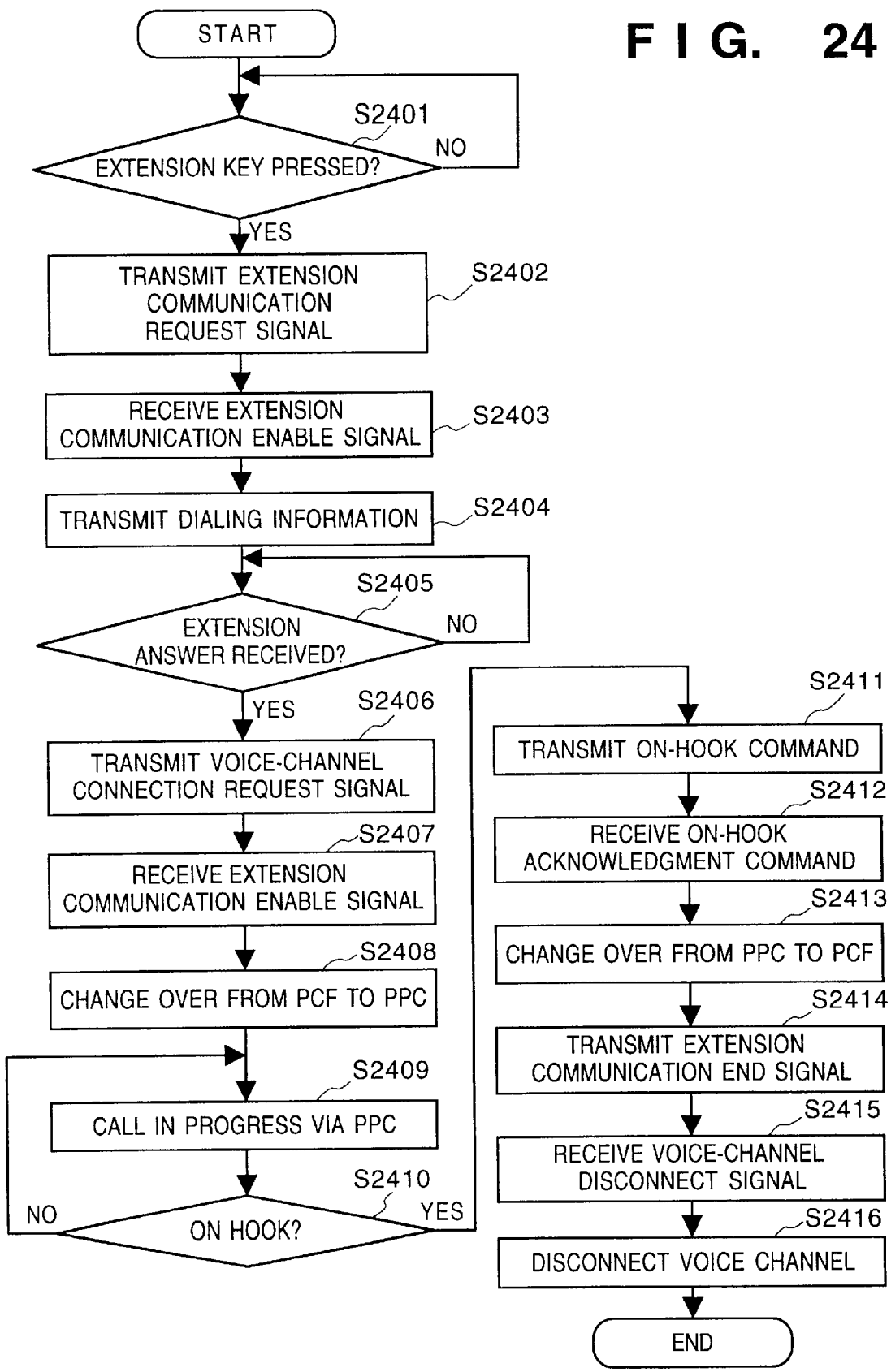
FIG. 24 is a flowchart of operation of the radiotelephone when a call is originated on an extension in the system embodying the present invention.
Figure 25:
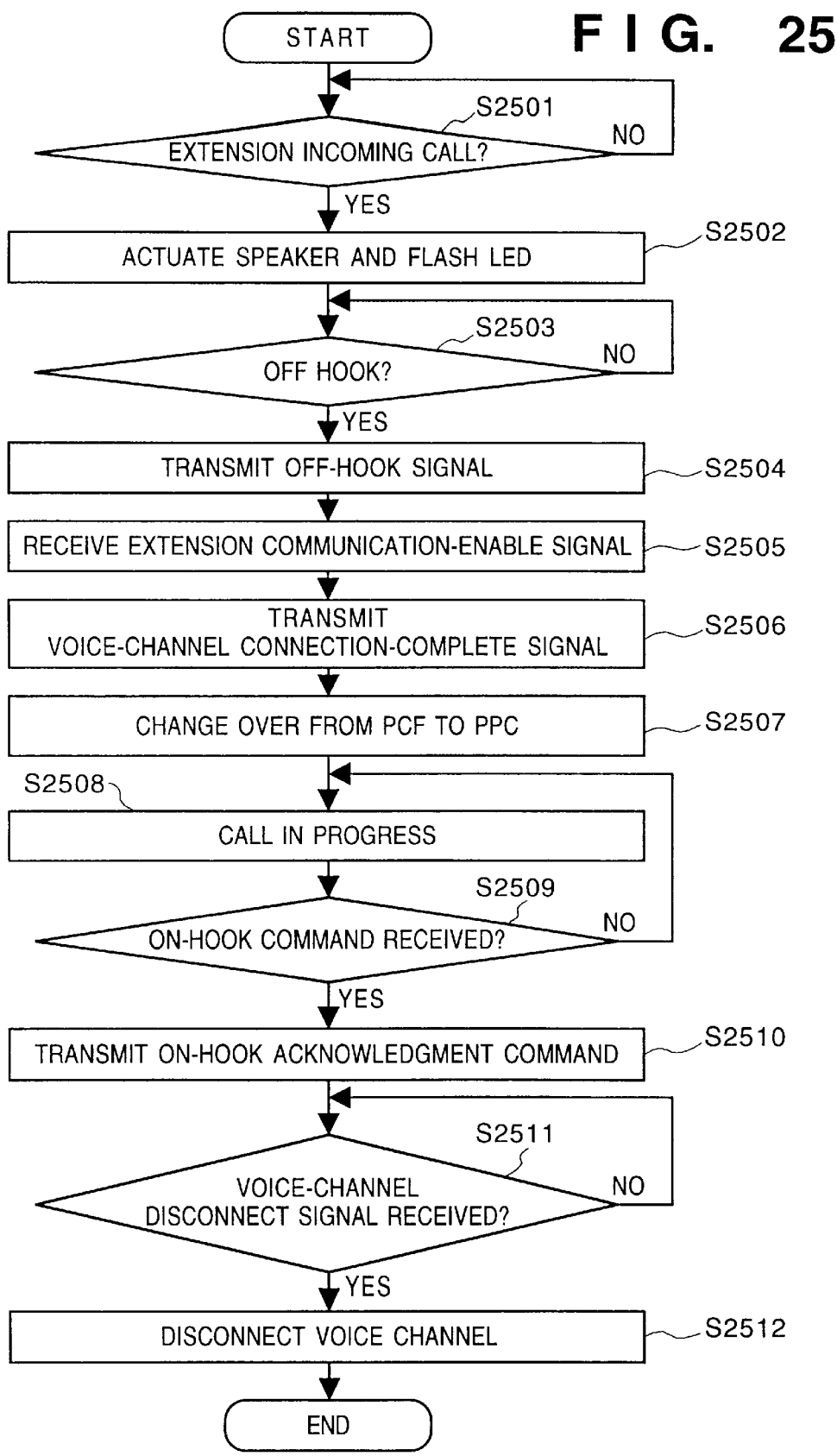
FIG. 25 is a flowchart of operation of the radiotelephone when a call is terminated on an extension in the system embodying the present invention.

FIG. 22 is a sequence diagram showing the flow of data in the main unit, connecting device, radiotelephone on the originating side and radiotelephone on the terminating side at the time of extension communication. FIG. 23 is a flowchart showing processing executed by the main unit, FIG. 24 is a flowchart showing processing executed by the radiotelephone on the originating side, and FIG. 25 is a flowchart showing processing executed by the radiotelephone on the terminating side.

When an extension key on the key matrix 412 is pressed (S2401) at the radiotelephone 103-A, the latter transmits an extension communication signal (2202) on the wireless link between the radiotelephone 103-A and connecting device 2 using the LCCH-R in one PCF frame of the line switching channel of FIG. 8 (S2402). Upon receiving the extension communication signal (2202), the connecting device 2 notifies the main unit. Upon receiving the signal indicative of extension communication (2201) (step S2301), the CPU 201 in the main unit 1 analyzes the terminal attribute of the originating radiotelephone 103-A and, if an outgoing call on the extension is possible (S2303), sends extension-communication enable (2203) to the radiotelephone 103-A via the connecting device 2 (S2304) using the LCCH-T of the PCF frame.

Next, upon receiving dialing information from the matrix key 412, the radiotelephone 103-A transmits dialing information (2208) to the main unit 1 (S2404). Furthermore, the end of dialing is monitored by time-out. Upon receiving the dialing information (2207) (step S2305), the main unit 1 analyzes the content of the dialing information and transmits the extension incoming call (2209) to the radiotelephone 103-B via the connecting device 2 (step S3106) using the LCCH-T of the PCF frame. Upon receiving the extension incoming-call signal (2210) at step S2501, the radiotelephone 103-B informs the operator of the incoming call through speaker and to prompt a response (S2502). The radiotelephone 103-B then waits for the user to operate the key matrix 412 and answer the call. If an answer from the user is detected (S2503), the radiotelephone 103-B sends an off-hook signal (2212) to the connecting device using the LCCH-R of the PCF frame, and the connecting device notifies the main unit 1 of the off-hook state (S2504).

Upon receiving off-hook (2212) from the radiotelephone 103-B (S2307), the main unit 1 sends extension answer (2213) to the radiotelephone 103-A, thereby giving notice of the fact that the radiotelephone 103-B has answered. In this extension answer (2213), the CPU 201 in the main unit 1 allocates communication resources, such as the idle time slot and hopping pattern stored in the RAM 203 and the voice channel (T1~T4, R1~R4) in the PPF frame used, to direct communication between the radiotelephone 103-A and radiotelephone 103-B which use one PPC frame of the line connecting channel, and transmits this communication resource information to the radiotelephone 103-A via the connecting device 2 as an extension answer (2203) using the LCCH-T of the PCF frame (step S2308). Upon receiving the extension-answer signal (step S2405), the radiotelephone 103-A transmits a voice-channel connection complete signal (2206) using the LCCH-R (step S2406). The connecting device 2 communicates a voice-channel connection complete command (2205) from the radiotelephone 103-A to the main unit 1. At the same time, the main unit 1 also sends the radiotelephone 103-B extension communication enable (2215) (step S2308). This contains communication resource information such as the hopping pattern and voice channel used for direct communication, which employs one PPC frame of the line switching channel. Upon verifying (S2407) the answer from the other party by means of the extension-answer signal (2214), the radiotelephone 103-A halts the ring-back tone, effects a changeover (S2408) to the PPC frame of the allocated line switching channel so as to implement the call to the communicating party and controls the microphone and speaker to establish the call to the party (S2409).

Upon receiving the extension communication-enable signal (2216) (step S2505), the radiotelephone 103-B halts the ringing tone, effects synchronization to the voice channel obtained from the communication resource information in the extension communication enable signal (2216) and transmits a voice-signal connection-complete signal (2218) to the main unit 1. A changeover to the PPC frame of the line switching channel is made to establish communication with the communicating party (S2507). In other words, when the radiotelephones communicate directly following the above-described processing, the control data and voice data exchanged between the telephones are communicated by the PPC frame of the line switching channel. More specifically, in Tn and Rn of the PPF shown in FIG. 9, the control data are communicated by the "D" time slot and the voice data are communicated by the "B" time slot, as shown in FIG. 12. It should be noted that reception of LCCH-T and transmission of LCCH-R are made possible by changing over to the frequency at which the PCF frame is being transmitted at the timing of the head of the frame also during the direct communication between the radiotelephones. This is a major characterizing feature of this system. If this arrangement is adopted, the PPF frame can be transmitted and received in sync with the synchronizing signal sent from the main unit. As a result, the PCF and PPF frames used in this system are always synchronized. Further, it is possible for data from the main unit 1 to be received even during extension communication. This makes it possible to accommodate a service such as call termination during communication.

If the main unit 1 receives the voice-signal connection complete signal (2217) from the radiotelephone 103-B (step S2309), the main unit 1 judges that communication has started between the radiotelephone 103-A and the radiotelephone 103-B and waits for the end of extension communication (step S2310). Meanwhile, the radiotelephone 103-A and the radiotelephone 103-B monitor the status of the wireless link and the user's operation of the key matrix 412. When the call ends and the on-hook state is detected at the radiotelephone 103-A (S2410), the radiotelephone 103-A transmits an on-hook signal (2220) to the radiotelephone 103-B (S2411). Upon receiving the on-hook signal (2220) (step S2509), the radiotelephone 103-B transmits an on-hook acknowledgment signal (2221) as control information in the communication channel (step S2510). Upon receiving the on-hook acknowledgment signal (2221) at step S2412, the radiotelephone 103-A changes over the communication channel to the PCF frame (S2413) and transmits an extension communication end signal (2223) to the connecting device 2 (step S2414). Extension communication end (2202) is transmitted to the main unit 1 (S2310) and voice channel disconnect (2224) is transmitted to the radiotelephone 103-A. Similarly, the main unit 1 transmits voice channel disconnect (2226) to the radiotelephone 103-B (S2311). Next, the main unit 1 releases the communication resources such as the voice channels allocated to the radiotelephones 103-A, B (S2312). The radiotelephones 103-A, 103-B that have received the voice channel disconnect signals (2225, 2227) also release resources (S2416, S2511, S2512).

Thus, it is possible to realize direct communication between extensions through the procedure described above.

(5) Processing for data transmission from computer to printer (processing when using packet switching channel)

Figure 26:
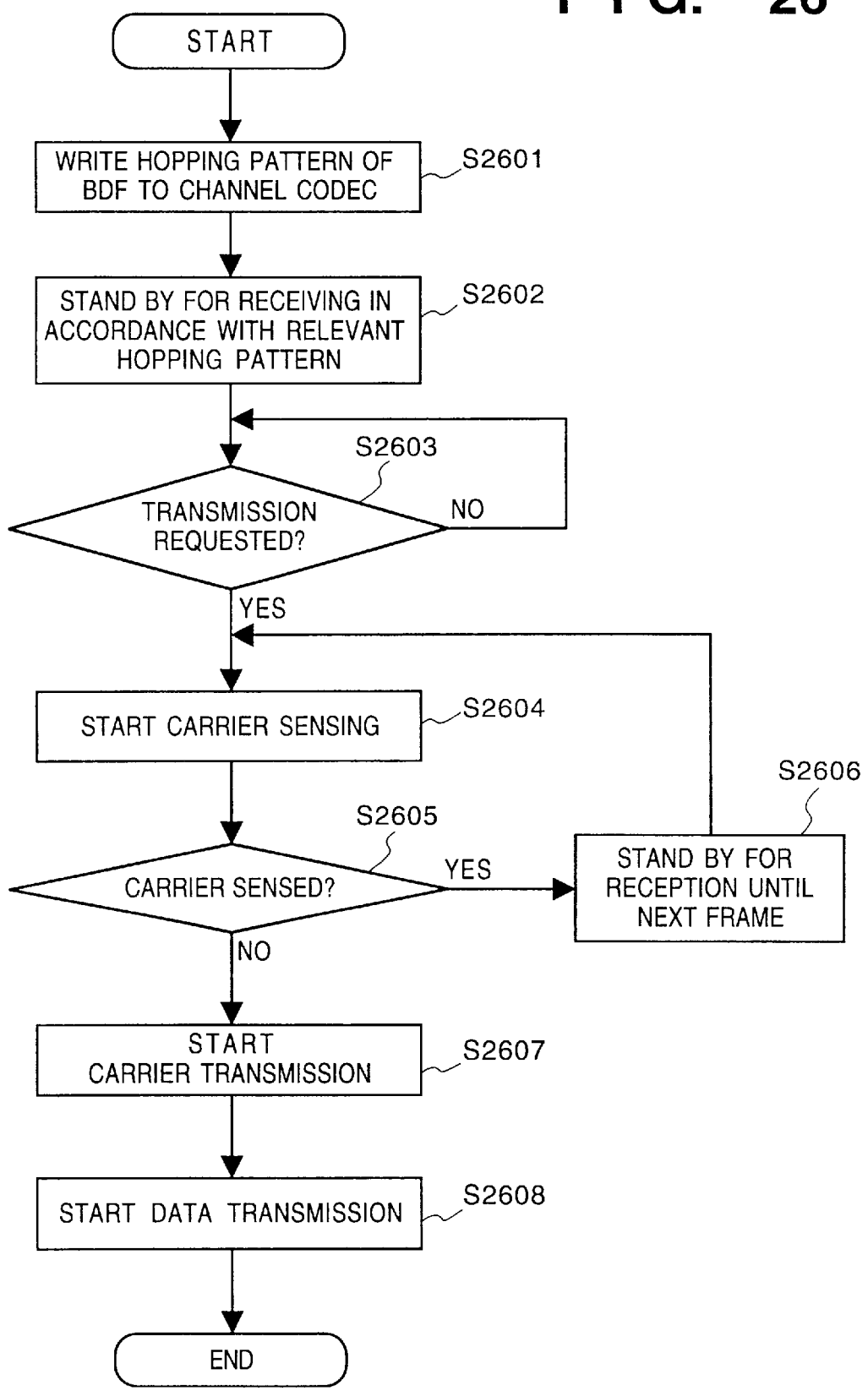
FIG. 26 is a flowchart of peer-to-peer data communication in the system embodying the present invention.

Processing for a case in which data are transmitted from a computer to a printer in bursts using the BDF frame of a packet switching channel will now be described as an example of communication between data terminals. Reference will be had to FIG. 26.

When a printing application program is started up in the computer, a wireless adapter driver installed in the data terminal operates to send a data transmission request and a transmission destination number (the extension number of the printer) to the wireless adapter 4 via the communication interface 506.

Next, the wireless adapter effects a transition to a procedure for originating a call. In this case, the BDF frame of the packet switching channel is used, unlike the case where use is made of the line switching channel. Further, since communication is performed between data terminals without intervention of the main unit, it is not required that the wireless adapter sends an outgoing-call request to the main unit. Instead, at introduction of power, it is required that the wireless adapter performs a frequency changeover operation that is synchronized to the hopping pattern allocated to the BDF frame of the packet switching channel, and that the wireless adapter be in a reception standby state.

More specifically, the wireless adapter refers to the BF field in the CNT-T sent from the main unit, recognizes the basic frame number at this time and sets a frequency, which corresponds to this basic frame number, in the wireless unit. A correspondence table giving the correspondence between basic frame numbers and frequencies is located within the channel codec. When the hopping pattern for the BDF frame has been sent immediately after start-up of the power supply, the CPU of the wireless adapter writes this hopping pattern in the channel codec (S2601).

Reception standby is performed in accordance with this hopping pattern (S2602). When transmission is requested (S2603), carrier detection is performed (S2604) using the carrier sensing field CS of the BDF frame. If the carrier is sensed (S2605), it may be construed that another terminal uses this BDF frame. Accordingly, transmission of data is suspended and reception standby is performed until the next frame (S2606).

If the carrier is not sensed (S2605), a carrier is transmitted (S2607) in order to indicate the intent to transmit data, and then the transmission of data is started (S2608). These data are read from the memory inside the adapter and data are transmitted in an amount equivalent to the DATA area of the BDF frame. Specifically, 306 bytes of data are transmitted.

If all terminals sense the carrier at the same timing in the above-described contention control based upon sensing of the carrier, the frequency with which collisions occur increases. Accordingly, the timing at which sensing of the carrier starts and the timing at which transmission of the carrier begins are selected randomly within a predetermined range of carrier sensing timing.

The printer on the receiving side also performs data reception while changing over the frequency in accordance with the hopping pattern allocated to the BDF frame of the packing switching channel. Of the data received, only that data having the address of the printed attached thereto are accepted in the internal memory as the printer's own data. When it becomes necessary for error information or the like to be communicated from the printer to the computer, the printer executes the transmission procedure.

Thus, in a wireless switching system embodying the present invention, a channel (PCF) used when a public line is accessed and channel (PPF, BDF) used in peer-to-peer communication are employed synchronously. As a result, all channels (PCF, PPF, BDF) used in system can be prevented from interfering with one another. Further, since the hopping patters used in communication between wireless terminals are stored by the wireless terminals, there is no need for a procedure through which a wireless terminal decides, prior to a data transmission and in cooperation with the communicating terminal, which frequency to use. As a result, there is no decrease in the effective data transmission speed.

Since a control frequency for data communication is not required, it is possible to use frequencies uniformly.

Since a channel for communication via a public line and a peer-to-peer channel are synchronized, adjacent channels no longer interfere with each other.

A case in which data are transmitted from a computer to a printer has been described as an example of communication between data terminals that use a packet switching channel. However, it is possible to execute processing through a similar procedure even in cases where a file is transferred between computers or where a computer accesses a wired LAN.

Further, it is assumed above that the computer uses only a packet switching channel based on the BDF frame. However, it is possible for the computer to access an outside line using a line switching channel when necessary.

The computer usually performs reception standby in accordance with the hopping pattern allocated to the BDF frame. However, in a case where it becomes necessary to access an outside line, the computer can execute the above-described procedure for originating a call on an outside line. Upon completion of communication over the outside line, the computer would perform standby reception again in accordance with the hopping pattern allocated to the BDF frame.

As many apparently widely different embodiments of the present invention can be made without departing from the spirit and scope thereof, it is to be understood that the invention is not limited to the specific embodiments thereof except as defined in the appended claims.

What is claimed is:

1. A wireless communication system for performing communication using frequency hopping, comprising:
a plurality of wireless communication terminals; and
a wireless control unit for performing centralized control of said wireless communication terminals;
said wireless control unit having:
storage means for storing at least a first hopping pattern by which said wireless communication terminals perform communication via said wireless control unit, and a second hopping pattern by which communication is performed between said wireless communication terminals not through said wireless control unit; and
transmitting means for transmitting said first and second hopping patterns to said wireless communication terminals;
at least one first wireless communication terminal having:
first receiving means for receiving the first hopping pattern transmitted by said transmitting means; and
first communication means for performing communication in accordance with the first hopping pattern;
at least one second wireless communication terminal having:
second receiving means for receiving the second hopping pattern transmitted by said transmitting means;
storage means for storing the second hopping pattern that has been received; and
second communication means for performing communication in accordance with the second hopping pattern in synchronism with said first communication means,
wherein said second receiving means receives the first hopping pattern as well, and said second communication means performs communication using the first hopping pattern as well.

2. The system according to claim 1, wherein said first and second communication means perform communication with all hopping patterns being synchronized in a case where there are a plurality of the first hopping patterns or the second hopping patterns.

3. The system according to claim 1, wherein said first and second communication means perform communication with all hopping patterns being synchronized in a case where there are a plurality of the first hopping patterns and the second hopping patterns.

4. A wireless communication system for performing communication using frequency hopping, comprising:
a plurality of wireless communication terminals; and
a wireless control unit for performing centralized control of said wireless communication terminals;

said wireless control unit having:
  storage means for storing at least a first hopping pattern by which said wireless communication terminals perform communication via said wireless control unit, and a second hopping pattern by which communication is performed between said wireless communication terminals not through said wireless control unit; and
  transmitting means for transmitting said first and second hopping patterns to said wireless communication terminals;
at least one first wireless communication terminal having:
  first receiving means for receiving the first hopping pattern transmitted by said transmitting means; and
  first communication means for performing communication in accordance with the first hopping pattern;
at least one second wireless communication terminal having:
  second receiving means for receiving the second hopping pattern transmitted by said transmitting means;
  storage means for storing the second hopping pattern that has been received; and
  second communication means for performing communication in accordance with the second hopping pattern in synchronism with said first communication means,
wherein a communication channel in the second hopping pattern has a transmission speed higher than that of a communication channel in the first hopping pattern.

5. A wireless communication terminal which is included in a wireless communication system having a plurality of wireless communication terminals and a wireless control unit and performing communication using frequency hopping, comprising:
  receiving means for receiving a first hopping pattern used in communication between the wireless communication terminal and the wireless control unit and a second hopping pattern used in communication between the wireless communication terminals without control through the wireless control unit, wherein said first and second hopping patterns are transmitted from the wireless control unit; and
  communication means for performing communication by synchronizing a first communication using said first hopping pattern with a second communication using said second hopping pattern.

6. A communication method in a wireless communication system, which has a plurality of wireless communication terminals and a wireless control unit for performing centralized control of said wireless communication terminals, for performing communication using frequency hopping, comprising:
  a storing step of storing, by said wireless control unit, at least a first hopping pattern by which said wireless communication terminals perform communication via said wireless control unit, and a second hopping pattern by which communication is performed between said wireless communication terminals not through said wireless control unit;
  a transmitting step of transmitting, by said wireless control unit, said first and second hopping patterns to said wireless communication terminals;
  a first receiving step of receiving, by at least one first wireless communication terminal, the first hopping pattern;
  a first communication step of performing communication, by the at least one first wireless communication terminal, in accordance with the first hopping pattern, which is synchronized to the second hopping pattern;
  a second receiving step of receiving, by at least one second wireless communication terminal, the second hopping pattern; and
  a second communication step of performing communication, by the at least one second wireless communication terminal, in accordance with the second hopping pattern; and
  a second communication step of performing communication, by the at least one second wireless communication terminal, in accordance with the second hopping pattern, which is synchronized to the first hopping pattern,
wherein said second receiving step includes receiving the first hopping pattern as well, and said second communication step includes performing communication using the first hopping pattern as well.

7. The method according to claim 6, wherein said first and second communication steps include performing communication with all hopping patterns being synchronized in a case where there are a plurality of the first hopping patterns or the second hopping patterns.

8. The method according to claim 6, wherein said first and second communication steps include performing communication with all hopping patterns being synchronized in a case where there are a plurality of the first hopping patterns and the second hopping patterns.

9. A communication method in a wireless communication system, which has a plurality of wireless communication terminals and a wireless control unit for performing centralized control of said wireless communication terminals, for performing communication using frequency hopping, comprising:
  a storing step of storing, by said wireless control unit, at least a first hopping pattern by which said wireless communication terminals perform communication via said wireless control unit, and a second hopping pattern by which communication is performed between said wireless communication terminals not through said wireless control unit;
  a transmitting step of transmitting, by said wireless control unit, said first and second hopping patterns to said wireless communication terminals;
  a first receiving step of receiving, by at least one first wireless communication terminal, the first hopping pattern;
  a first communication step of performing communication, by the at least one first wireless communication terminal, in accordance with the first hopping pattern, which is synchronized to the second hopping pattern;
  a second receiving step of receiving, by at least one second wireless communication terminal, the second hopping pattern; and
  a second communication step of performing communication, by the at least one second wireless communication terminal, in accordance with the second hopping pattern, which is synchronized to the first hopping pattern,
wherein a communication channel in the second hopping pattern has a transmission speed higher than that of a communication channel in the first hopping pattern.

10. A method for controlling a wireless communication terminal which is included in a wireless communication system having a plurality of wireless communication terminals and a wireless control unit and performing communication using frequency hopping, comprising:

a receiving step of receiving a first hopping pattern used in communication between the wireless communication terminal and the wireless control unit and a second hopping pattern used in communication between the wireless communication terminals without control of the wireless control unit, wherein said first and second hopping patterns are transmitted from the wireless control unit; and a communication step of performing communication by synchronizing a first communication using said first hopping pattern with a second communication using said second hopping pattern.

11. A wireless communication system for performing communication using frequency hopping, comprising:

a plurality of wireless communication terminals; and a wireless control unit for performing centralized control of said wireless communication terminals;

said wireless control unit having transmitting means for transmitting a synchronous signal for synchronizing a first hopping pattern used in communication between the wireless control unit and the wireless communication terminals with a second hopping pattern used in communication between the wireless communication terminals not through the wireless control unit;

at least one wireless communication terminal having:

a receiving means for receiving the synchronous signal transmitted from said wireless control unit; and a communication means for performing communication by synchronizing the first hopping pattern with the second hopping pattern based on the synchronous signal received by said receiving means.

12. A wireless communication system according to claim 11, wherein said receiving means receives the synchronous signal during communication using said second hopping pattern.

13. A wireless communication system according to claim 11, wherein said at least one wireless communication terminal synchronizes the second hopping pattern with the first hopping pattern based on the synchronous signal received by said receiving means when performing communication not through the wireless control unit.

14. A wireless communication system according to claim 11, wherein said communication means synchronizes a first timing of switching frequencies based on the first hopping pattern with a second timing of switching frequencies based on the second hopping pattern.

15. A wireless communication terminal for performing communication with a wireless control unit and other wireless communication terminals using frequency hopping, said wireless communication terminal comprising:

receiving means for receiving a synchronous signal, transmitted from the wireless control unit, for synchronizing a first hopping pattern used in communication between the wireless control unit and the wireless communication terminal with a second hopping pattern used in communication between wireless communication terminal and other wireless communication terminals not through the wireless control unit; and communication means for performing communication by synchronizing the first hopping pattern with the second hopping pattern based on the synchronous signal received by said receiving means.

16. A wireless communication terminal according to claim 15, wherein said receiving means receives the synchronous signal during communication using said second hopping pattern.

17. A wireless communication terminal according to claim 15, wherein said communication means synchronizes the second hopping pattern with the first hopping pattern based on the synchronous signal received by said receiving means when performing communication not through the wireless control unit.

18. A wireless communication terminal according to claim 15, wherein said communication means synchronizes a first timing of switching frequencies based on the first hopping pattern with a second timing of switching frequencies based on the second hopping pattern.

19. A wireless control unit for controlling communication of a plurality of wireless communication terminals, comprising:

communication means for performing communication with a wireless communication terminal using a first hopping pattern; and transmitting means for transmitting a synchronous signal for synchronizing the first hopping pattern with a second hopping pattern to the wireless communication terminal performing communication via said communication means and to other wireless communication terminals performing communication between the wireless communication terminals using the second hopping pattern not through the wireless control unit.

20. A wireless control unit according to claim 19, wherein said transmitting means transmits a synchronous signal for synchronizing a first timing of switching frequencies based on the first hopping pattern with a second timing of switching frequencies based on the second hopping pattern.

21. A method of controlling a wireless communication system having a plurality of wireless communication terminals and a wireless control unit and performing communication using frequency hopping, comprising the steps of:

transmitting, by said wireless control unit, a synchronous signal for synchronizing a first hopping pattern used in communication between the wireless control unit and a wireless communication terminal with a second hopping pattern used in communication between wireless communication terminals not through the wireless control unit;

receiving, by a wireless communication terminal, the synchronous signal transmitted from said wireless control unit; and performing communication by synchronizing the first hopping pattern with the second hopping pattern based on the synchronous signal received in said receiving step.

22. A method of controlling a wireless communication terminal which is included in a wireless communication system having a plurality of wireless communication terminals and a wireless control unit and performing communication using frequency hopping, comprising the steps of:

receiving a synchronous signal, transmitted from said wireless control unit, for synchronizing a first hopping pattern used in communication between the wireless control unit and the wireless communication terminal with a second hopping pattern used in a communication between wireless communication terminals not through the wireless control unit; and performing communication by synchronizing the first hopping pattern with the second hopping pattern based on the synchronous signal received in said receiving step.

23. A method of controlling a wireless control unit which is included in a wireless communication system having a plurality of wireless communication terminals and a wireless control unit and performing communication using frequency hopping, comprising the steps of:

performing communication with a wireless communication terminal using a first hopping pattern; and transmitting a synchronous signal for synchronizing the first hopping pattern with a second hopping pattern to the wireless communication terminal performing communication in said communication step and wireless communication terminals performing communication between the wireless communication terminals using the second hopping pattern not through the wireless control unit.

* * * * *

UNITED STATES PATENT AND TRADEMARK OFFICE
CERTIFICATE OF CORRECTION

PATENT NO. : 6,032,049

DATED : February 29, 2000

INVENTOR(S): MICHIHIRO IZUMI

It is certified that error appears in the above-identified patent and that said Letters Patent is hereby corrected as shown below:

SHEET NO. 14:
Figure 18: "HOPPONG" should read --HOPPING--.

COLUMN 1:
Line 48, "that" should read --so that--.

COLUMN 2:
Line 39, "used" should read --used in--.

COLUMN 17:
Line 47, "patters" should read --patterns--.

COLUMN 18:
Line 56, "are" should read --is--; and
Line 61, "are" should read --is--.

UNITED STATES PATENT AND TRADEMARK OFFICE
CERTIFICATE OF CORRECTION

PATENT NO. : 6,032,049

DATED : February 29, 2000

INVENTOR(S): MICHIHIRO IZUMI

It is certified that error appears in the above-identified patent and that said Letters Patent is hereby corrected as shown below:

<u>COLUMN 20</u>:
Line 23, "are" should read --is--; and
Line 28, "are" should read --is--.

Signed and Sealed this

Twentieth Day of March, 2001

*Attest:*

NICHOLAS P. GODICI

*Attesting Officer*   *Acting Director of the United States Patent and Trademark Office*